US012229207B2

(12) United States Patent
Kurtanovic et al.

(10) Patent No.: US 12,229,207 B2
(45) Date of Patent: *Feb. 18, 2025

(54) DATA PROCESSING SYSTEM FOR DATA SEARCH AND RETRIEVAL AUGMENTATION AND ENHANCED DATA STORAGE

(71) Applicant: Medullar Solutions Inc., New York, NY (US)

(72) Inventors: Zijad Kurtanovic, Offenbach (DE); Konrad Gulla, Pinneberg (DE)

(73) Assignee: Medullar Solutions Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/409,358

(22) Filed: Jan. 10, 2024

(65) Prior Publication Data

US 2024/0220560 A1   Jul. 4, 2024

Related U.S. Application Data

(63) Continuation of application No. 18/116,618, filed on Mar. 2, 2023, now Pat. No. 11,971,940, which is a
(Continued)

(51) Int. Cl.
*G06F 16/95* (2019.01)
*G06F 9/54* (2006.01)
(Continued)

(52) U.S. Cl.
CPC .......... *G06F 16/9538* (2019.01); *G06F 9/547* (2013.01); *G06F 16/9535* (2019.01);
(Continued)

(58) Field of Classification Search
CPC .......... G06F 16/9535; G06F 16/9538
See application file for complete search history.

(56) References Cited

U.S. PATENT DOCUMENTS 8,799,307 B2    8/2014  Chin et al.
10,084,841 B2 *  9/2018  Conklin .............. H04L 65/764
(Continued)

FOREIGN PATENT DOCUMENTS

JP   2001-229180   8/2001
JP   2006-107473   4/2006
(Continued)

OTHER PUBLICATIONS en.wikipedia.org [online], "Cache (computing)," Dec. 13, 2018, retrieved on Jun. 9, 2022, retrieved from URL<https://en.wikipedia.org/w/index.php?title=Cache_(computing)&oldid=873555421>, 9 pages.

(Continued)

*Primary Examiner* — Eliyah S. Harper
(74) *Attorney, Agent, or Firm* — Fish & Richardson P.C.

(57) ABSTRACT

A data processing system is configured to augment a request for data. The data processing system includes a recommendation engine configured to receive, from a client device over a network, interaction data related to a user interaction with one or more data sources, generate extracted data that includes one or more portions of at least one resource of the one or more data sources. The extracted data is generated based on the interaction data. The data processing system parses the extracted data to identify one or more metrics of the extracted data, and retrieves, from the one or more data sources, the additional data based on the metric. A results compiler is configured to receive a request for data from the client device, and responsive to the request, send the additional data to the client device for presentation.

20 Claims, 10 Drawing Sheets

Related U.S. Application Data continuation of application No. 16/750,771, filed on Jan. 23, 2020, now Pat. No. 11,625,445.

(60) Provisional application No. 62/795,674, filed on Jan. 23, 2019.

(51) Int. Cl.
| | | |
|---|---|---|
| *G06F 16/9535* | (2019.01) | |
| *G06F 16/9538* | (2019.01) | |
| *G06F 40/10* | (2020.01) | |
| *G06F 40/40* | (2020.01) | |
| *H04L 67/306* | (2022.01) | |

(52) U.S. Cl.
CPC .............. *G06F 40/10* (2020.01); *G06F 40/40* (2020.01); *H04L 67/306* (2013.01)

(56) References Cited

U.S. PATENT DOCUMENTS

| | | | | |
|---|---|---|---|---|
| 10,269,024 | B2* | 4/2019 | Kaib | G06Q 30/0201 |
| 10,616,413 | B1* | 4/2020 | Vyas | H04M 3/5175 |
| 10,992,612 | B2* | 4/2021 | Burbank | H04L 51/216 |
| 11,016,650 | B1* | 5/2021 | Kritzer | G06F 3/0482 |
| 11,017,764 | B1* | 5/2021 | Das | G06F 16/24578 |
| 11,625,445 | B2 | 4/2023 | Kurtanovic | |
| 11,729,478 | B2* | 8/2023 | Hitching | G06F 16/784 |
| | | | | 725/41 |
| 11,971,940 | B2 | 4/2024 | Kurtanovic et al. | |
| 2005/0085219 | A1 | 4/2005 | Rogier | |
| 2006/0074883 | A1 | 4/2006 | Teevan | |
| 2006/0122976 | A1 | 6/2006 | Baluja et al. | |
| 2006/0271520 | A1 | 11/2006 | Ragan | |
| 2011/0258049 | A1* | 10/2011 | Ramer | G06Q 30/0273 |
| | | | | 705/14.69 |
| 2012/0166415 | A1 | 6/2012 | Lewallen | |
| 2012/0173373 | A1* | 7/2012 | Soroca | H04W 4/02 |
| | | | | 705/26.3 |
| 2018/0089652 | A1* | 3/2018 | Hiranandani | G06Q 20/027 |
| 2018/0096278 | A1* | 4/2018 | Lev-Tov | G10L 15/22 |
| 2018/0373994 | A1 | 12/2018 | Doucette et al. | |
| 2019/0108285 | A1 | 4/2019 | Stillwell et al. | |
| 2019/0294720 | A1* | 9/2019 | Beringer | G06F 16/26 |
| 2020/0021873 | A1* | 1/2020 | Swaminathan | H04N 21/466 |
| 2020/0233898 | A1 | 7/2020 | Barzelay et al. | |
| 2020/0233917 | A1* | 7/2020 | Kurtanovic | G06F 16/9538 |
| 2021/0201349 | A1* | 7/2021 | Singh | G06N 20/00 |
| 2023/0098800 | A1* | 3/2023 | Benner | G06Q 30/0205 |
| | | | | 705/14.41 |
| 2023/0244783 | A1* | 8/2023 | Zhou | G06F 21/55 |
| | | | | 726/23 |
| 2023/0315796 | A1 | 10/2023 | Kurtanovic | |

FOREIGN PATENT DOCUMENTS

| | | |
|---|---|---|
| JP | 2010-527494 | 12/2010 |
| JP | 2012-168653 | 6/2012 |
| JP | 2018-124672 | 9/2018 |
| WO | WO 2018/033982 | 2/2018 |

OTHER PUBLICATIONS

International Preliminary Report on Patentability in International Appln. No. PCT/US2020/014829, mailed on Aug. 5, 2021, 9 pages.
International Search Report and Written Opinion in International Application No. PCT/US2020/014829, mailed on Apr. 24, 2020, 13 pages.
Office Action by European Appln. No. 20708745.3, mailed on Feb. 14, 2022, 5 pages.
Office Action in European Appln. No. 20708745.3, mailed on Jan. 19, 2023, 8 pages.
Office Action in Australian Appln. No. 2020212023, mailed on Nov. 28, 2023, 4 pages.
Office Action in Canadian Appln. No. 3123888, mailed on Feb. 19, 2024, 6 pages.
Office Action in Japanese Appln. No. 2021-535158, mailed on Jan. 31, 2024, 38 pages (with English translation).
searchenginejournal.com, "Google Begins Using Neural Matching to Understand Synonyms, Impacting 30% of Queries," Sep. 24, 2018, retrieved on Nov. 4, 2024, retrieved from URL <https://www.searchenginejournal.com/google-begins-using-neural-matching-to-understand-synonyms-impacting-30-of-queries/271035/>, 8 pages.

* cited by examiner

DATA PROCESSING SYSTEM FOR DATA SEARCH AND RETRIEVAL AUGMENTATION AND ENHANCED DATA STORAGE

CLAIM OF PRIORITY

This application is a continuation of U.S. patent application Ser. No. 18/116,618, filed on Mar. 2, 2023, which is a continuation of U.S. patent application Ser. No. 16/750,771, filed on Jan. 23, 2020, which claims priority under 35 U.S.C. § 119(e) to U.S. Provisional Application Ser. No. 62/795,674, filed on Jan. 23, 2019, the entire contents of each of which are hereby incorporated by reference.

TECHNICAL FIELD

This disclosure relates to data processing, and more particularly to enhancing data for storage and retrieval.

BACKGROUND

Search engines enable users to access data in a networked computing system. Users, through a client computing device, may submit a request for data (e.g., a search query) to another computing system. The computing system receiving the search request typically includes a server system or other remote computing system, but in some cases, the user may be requesting data from a local system. The other computing system receives the request, identifies search results, and provides the search results to the user through the client device.

The user typically selects a resource for performing the search, and the search results are typically constrained to the data available to the chosen resource.

SUMMARY

This document describes a data processing system that augments data search and data retrieval and provides enhanced data storage for facilitating data access. Often, when users of a conventional search system attempt to find content (e.g., for a research project), the search is restricted to particular resources available to the particular search system being used. In order to ensure a full search of resources has been conducted, a user may have to access a series of search systems (e.g., proprietary databases, search engines, etc.) in sequence. When the user completes a search using a first resource and proceeds to a second resource, the user repeats the process and often performs redundant searches on each system to ensure that all resources have been found. Furthermore, a user might have to enter search queries in a particular syntax for each different resource to ensure that the search returns relevant results, which can be time consuming.

Additionally, in conventional search systems, a user often searches without any context being given to the search system, such as what types of search results the user prefers and what sources the user prefers. The user often selects a type of search result a priori to performing the search (e.g. video results, news results, shopping results, etc.), which restricts the results received to the particular category that is determined by the search system. The categories are typically designed without taking the preferences of the particular user into account.

Generally, search systems often categorize resources for providing them to users, and sometimes show snippets of the results to users to provide some context of the result to the user. However, the snippet shown is agnostic to the research project being conducted by the user and agnostic to the user performing the search. As a result, the user often must visit the resource address and find the relevant content of the resource by manually reading the text of the resource, viewing the images, watching the video, and so forth.

In many search systems, the user also does not benefit from similar research performed by other users. For example, some users may have similar preferences to the user, and thus the user could benefit from those preferences when performing a search. A user could also piggyback the research efforts of similar users rather than performing redundant research tasks, saving research time, reducing the number of request (and network traffic) of conventional search systems.

The data processing system described herein is configured to address these issues and others, as described below. The data processing system includes data processing engine configured to interface with existing data sources (e.g., data repositories, search engines, websites, publishers, etc.) and enhance search and retrieval of data from those data sources.

In some implementations, the data processing system is pre-configured to include trained classifier models that categorize terms into topics. The topics can each be associated with one or more data sources in a generated map.

The data processing engine can be added to an application on the client device or be a stand-alone application on the client device. As a user sends requests (e.g., search queries) for data to the one or more data sources, the data processing system analyzes the requests and preprocesses (e.g., spell-corrects, filters, etc.) and augments the requests with context data (e.g., additional search terms, keywords, etc.) to improve the scope of the search.

The data processing system assists the user by formatting the data request as needed for different data sources. For example, different repositories may have different search syntax or different application programming interfaces (APIs) for conducting searches on those repositories. The data processing system formats a request to comply with the requirements of each of the data sources that are available to the user, so the user may conduct comprehensive research from a single location (e.g., using a particular search engine) and use a single search query to perform a search across different repositories.

Additionally, the data processing system includes data storage configured to store data received in response (e.g., search results or any other contest received in response to the request) to the request for data by the user. The data processing system is configured to curate the response data that is received from the data sources. The curation can occur automatically as a user sends requests for data, manually as a user interacts with the response data, or a combination of both automatic and manual curation. The curated response data are stored as a data collection. The data collection is associated with the research being performed by the user, and can be available to other authorized users of the data processing system. The data collection is associated with metadata that improves the utility of the data collection to the user (or to similar users). The metadata can include, for example, ranking data that is particular to the research topic(s) identified for that data collection.

The data processing system is configured to profile users based on the interactions of the users with the data processing system. As a user's preferences for particular data sources emerges (e.g., a user might prefer response data from a particular repository), the data processing system adjusts which response data are presented to the user. For example, the user may prefer results from a particular author or organization, results from a particular time period, results of a different language, etc. As users develop profiles, similar users can be identified to one another (e.g., within an organization) and the users may share data collections. For example, if two different users working for the same company are researching a particular topic, the users may be identified to one another to avoid redundant research. Such identification may be based at least in part on a degree of similarity between feature sets of the user profiles. For example, if a particular user's profile has a feature set that is within a threshold degree of similarity to a feature set of another user's profile, the similar user profile can be identified.

In some implementations, the data processing system is configured to augment a request for data and includes a recommendation engine. The recommendation engine is configured to receive, from a client device over a network, interaction data related to a user interaction with one or more data sources. The recommendation engine is configured to generate extracted data that includes one or more portions of at least one resource of the one or more data sources, wherein the extracted data is generated based on the interaction data. The recommendation engine is configured to parse the extracted data to identify one or more metrics of the extracted data, the one or more metrics being indicative of additional data that is related to the extracted data. The recommendation engine is configured to retrieve, from the one or more data sources, the additional data based on the metric. In some implementations, the data processing system includes a results compiler. In some implementations, the results compiler is configured to receive a request for data from the client device. The results compiler is configured to, responsive to the request, send the additional data to the client device for presentation by the client device.

In some implementations, the results compiler is further configured to retrieve search results from a third party search engine, the search results being responsive to one or more keywords of the request for data from the client device. The results compiler is configured to select a portion of the additional data that is responsive to the one or more keywords of the request for data for presentation with the search results. The results compiler is configured to send, to the client device, the portion of the additional data and the search results for presentation in separate regions of a user interface of the client device.

In some implementations, the one or more metrics comprise a data type of the extracted data, a data source of the extracted data, one or more topics represented in the extracted data, a language type represented in the extracted data, and one or more links to an additional resource in the extracted data.

In some implementations, the data type of the extracted data comprises an image, and wherein parsing the extracted data comprises performing image processing on the image to extract a feature of the image, the feature being indicative of the additional data that is related to the extracted data.

In some implementations, the interaction data comprises one or more of an identifier of a resource that is presented by the client device, a length of time that the resource is presented by the client device, a selection of a portion of the resource, execution of executable code in the resource, playback of media in the resource, bookmarking of the resource, and a download of the portion of the resource.

In some implementations, the data processing system further includes a profile engine configured to store the interaction and execution data related to a user in a user profile. The profile engine is configured to determine a feature set of the stored interaction and execution data, the feature set being indicative of at least one of one or more topics of increased relevance relative to other topics, one or more data sources preferred by the user, and one or more content types preferred by the user. The profile engine is configured to determine another user profile having another feature set that is within a threshold degree of similarity to the feature set of the user profile. The profile engine is configured to identify the other user profile to the client device.

In some implementations, the profile engine is further configured to identify one or more resources stored in the other user profile and send the one or more resources to the client device.

In some implementations, the data processing system further includes a text analysis engine configured to receive the request for data from the client device. The text analysis engine is configured to apply a language model to the request for data to identify one or more additional topics. The text analysis engine is configured to send the one or more additional topics to the recommendation engine.

In some implementations, the text analysis engine is further configured to translate the request to another language and request, using the translated request, data from the one or more data sources.

In some implementations, the data processing system further includes a trend analytics engine configured to analyze a plurality of requests for data received by the recommendation engine, estimate, from the plurality of requests, a future request for data by the client device, and retrieve results data responsive to the future request for data.

In some implementations, for each of the one or more data sources, the recommendation engine is configured to translate the request for data to comply with a syntax of the respective data source. The recommendation engine can be further configured to request additional response data from the one or more data sources with the translated request for data. The recommendation engine can be configured to combine, with the additional data, the additional response data that is received from the one or more data sources in response to the request for the additional response data. The recommendation engine can be configured to send the additional data combined with the additional response data to the client device.

In another aspect, a data processing system includes a user interface. The user interface includes a presentation panel for displaying networked content from one or more data sources, the networked content comprising one or more resources and one or more controls for allowing interaction with the networked content. The data processing system includes a data processing engine configured to receive a signal from the user interface indicative of a user interaction with at least a portion of a resource of the one or more resources of the networked content. The data processing engine is configured to, in response to receiving the signal, extract, from the networked content, the portion of the resource. The data processing engine is configured to parse the portion of the resource that is extracted from the networked content to obtain one or more keywords represented in the portion of the resource. The data processing engine is configured to perform a first search of one or more local data sources that are networked to the data processing engine for one or more local resources that are related to the one or more keywords. The data processing engine is configured to perform a second search of one or more remote data sources that are networked to the data processing engine for one or more remote resources that are related to the one or more keywords. The data processing engine is configured to receive, in response to performing the first search and the second search, one or more search results comprising one or both of at least one local resource or at least one remote resource. The data processing engine is configured to cause the presentation panel to present the one or more search results.

In some implementations, the signal from the user interface comprises one or more of a selection of the one or more controls, data representing a length of time that the portion of the resource is viewed, data indicative of a selection of a link to another resource from the portion of the resource, data indicative of a selection of the portion of the resource, and data indicative of an execution of executable code included in the portion of the resource.

In some implementations, the signal comprises metadata indicative of one or more of a data type of the portion of the resource, one or more other resources that are accessed prior to the portion of the resource, or a data source of the portion of the resource.

In some implementations, performing the first search includes retrieving authorization data for accessing a local data source of the one or more local data sources, providing the authorization data to the local data source, and receiving local results data from the local data source.

In some implementations, the authorization data is retrieved from a local storage.

In some implementations, performing the second search includes configuring a request for data to conform to an application programming interface (API) of each of the one or more remote sources, sending the configured request to each of the one or more remote data sources, and receiving results data from the one or more remote data sources.

In some implementations, the one or more remote data sources are identified responsive to receiving the signal from a registry of data sources.

In some implementations, the portion of the resource includes an image, and wherein parsing the portion of the resource comprises performing image processing on the image to extract one or more features of the image, the one or more features being indicative of the one or more keywords.

In some implementations, the portion of the resource includes a collection of text, and the one or more keywords are words in the collection of text.

In some implementations, the one or more search results include a particular portion of a particular resource, the particular portion being based on one or more metrics associated with the portion of the resource that is extracted from the networked content.

In some implementations, the one or more metrics include a type of data, and the portion of the resource and the particular portion of the particular resource include the type of data.

In some implementations, causing the presentation panel to present the one or more search results includes causing the one or more search results to be presented on the user interface along with one or more other search results provided by a third party search engine.

In some implementations, causing the presentation panel to present the one or more search results includes causing the one or more search results to be presented along with the portion of the resource.

In some implementations, each search result of the one or more search results represents a respective resource, and causing the presentation panel to present the one or more search results includes presenting a portion of each of the one or more resources.

The data processing system described herein includes the following advantages. The data requests of a user are preprocessed and augmented to ensure that the most relevant data are captured by the data sources in responses sent back to the user. For example, the data processing system can automatically add context data to a search query of the user to enhance the search query. The added context can be particular to the user, so that the results data that are received by the user in response to the data request are more relevant for that particular user. For example, the data processing system may add synonyms, search in other languages, add search keywords (e.g., topics) to the search that are relevant to the curated collection being developed, and so forth.

The data processing system provides personalized results data to a user from all available data sources. A user need not repeat data requests (e.g., search queries) for different repositories, or even be aware that the plurality of data sources are available. The request can be formatted for each data source as needed. Thus, the user does not conduct searches in different data silos, which can be redundant, but a single comprehensive search can be performed. A user can simultaneously search local data sources (which may be behind a firewall or other data security layers) and remote sources (e.g., public or semi-public repositories).

The results data can be curated (e.g., automatically as the user searches, manually, or both), so that only highly relevant results are saved, rather than wholesale search results. The curated results have personalized rankings so that data most relevant to the particular collection is emphasized (e.g., shown first in a list of results in a search of that collection, etc.). As a user conducts research, the user profile is developed, and the results received are more and more germane to the particular user and to the particular research task being performed. The data processing system can identify similar users (e.g., within an organization), and offer to share the data collections of the users (e.g., merge data collections) to avoid redundant research on a topic and improve efficiency of the research. The user need not be aware of the similar user—the data processing system can automatically identify the similar user. Thus, the data processing system enables the retrieval of data that might otherwise not be returned to the user in response data from the data sources.

The data processing system provides the most relevant portions (e.g., snippets) of the results data to the user based on the current research project being performed and based on the identification of the user. For example, the data processing system can extract a video from a resource (e.g., a web page) and provide only the video to the user as a result, reducing the amount of data transmitted to the user by removing data in the results in which the user is not interested.

The details of one or more embodiments of the data processing system are set forth in the accompanying drawings and the description below. Other features, objects, and advantages of the data processing system will be apparent from the description and drawings, and from the claims.

DESCRIPTION OF DRAWINGS

Like reference symbols in the various drawings indicate like elements.

DETAILED DESCRIPTION

A data processing system augments data search and data retrieval and provides enhanced data storage for facilitating data access. The data processing system is configured to preprocess and augment a request for data provided by a user to enable the user to search a plurality of different data sources simultaneously and to increase a relevance of the data that are returned and presented to the user. The data processing system is configured to assist a user in curating the data received in response to a request for the data and provide enhanced storage for storing the curated results for the user. The data processing system profiles the user to identify similar users and increase the relevance of the results data received by the user and to configure how the response data are curated and stored.

Computing Environment

Figure 1:
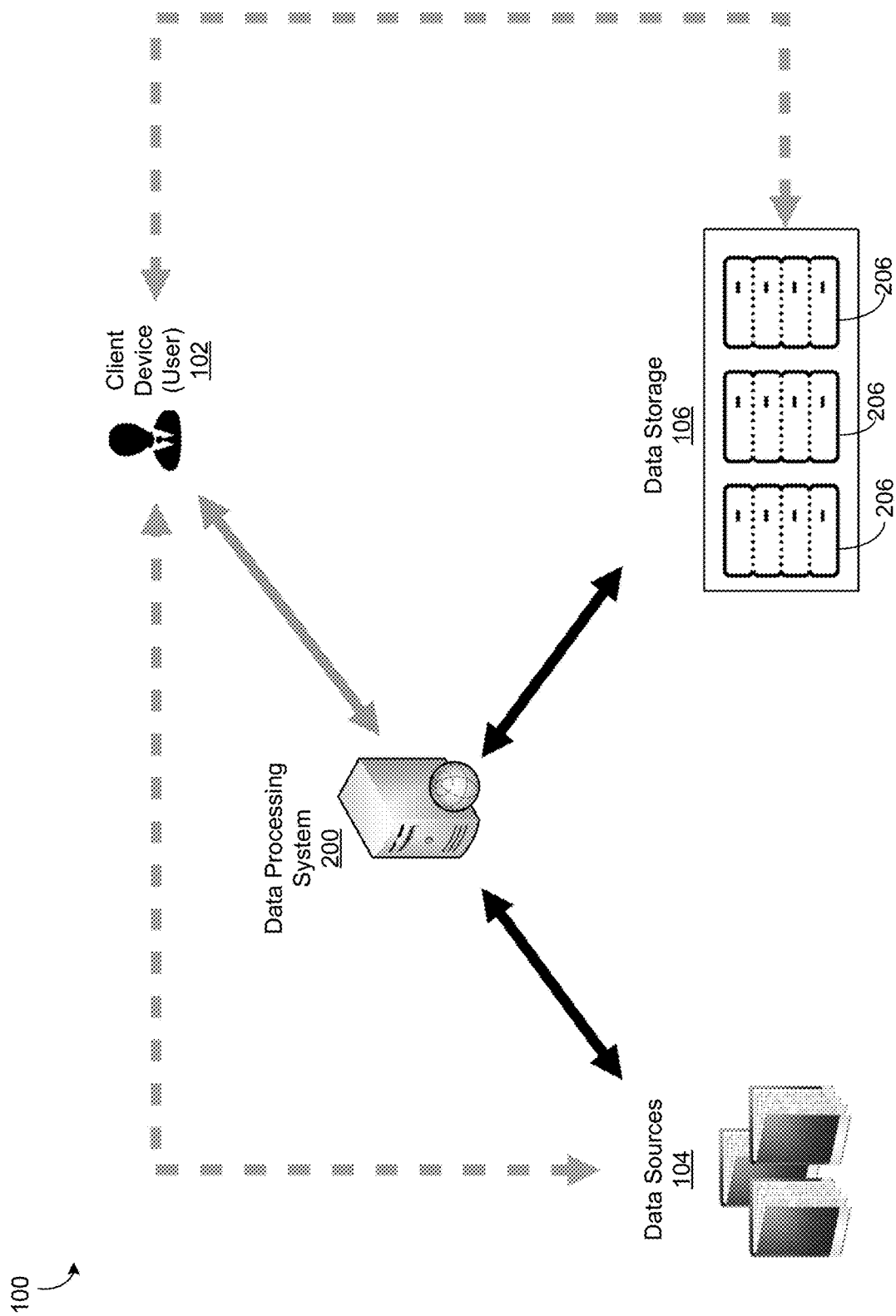
FIG. 1 shows an example networked computing environment for a data processing system.

FIG. 1 shows an example networked computing environment 100 for a data processing system 200. The data processing system 200 includes data processing engine 202 (shown in FIG. 2) configured to interface with data sources 104. The data processing system 200 can be executed on a client device 102, such as a user device. In this example, the client device 102 executes the logic of the data processing system 200. In this document, when data is sent to a user of the data processing system 200, it is intended to mean that the data is sent to the client device 102 of the user. Likewise, when a user sends data (e.g., a request for data) to another device, it is intended to mean that the request for data is being sent by the client device 102 of the user to another device. In some implementations, the data processing system 200 is implemented on a remote device from the client device 102, such as a server system (e.g., as shown in FIG. 1). The user accesses the data processing system 200 through a web portal or other means on the client device 102, while the server system actually executes the logic of the data processing system 200. In some implementations, a portion of the data processing system 200 logic is executed by the client device 102, and another portion of the data processing system 200 logic is executed by the server system.

Private, Public, Professional Data Repositories

The networked computing environment 100 of the data processing system 200 includes one or more data sources 104. The data sources 104 can include any source of data in the networked computing environment, either local and/or private to the user (e.g., to the user's client device 102) or remote from and/or public to the user. For example, data sources 104 can include one or more data repositories, either public (e.g., Westlaw, JSTOR, Forrester, etc.) or private (e.g., a company version control repository, SharePoint, company email server, company cloud storage, etc.). The data sources can also include web crawlers, search engines, content publishers (e.g., websites), public or private databases, and so forth.

Research Session

As a user sends requests (e.g., search queries) for data to the one or more data sources 104, the data processing system 200 analyzes the requests and augments the requests with context data, as described in further detail below. A group of related data requests is sometimes referred to herein as a research session, a search session, a research task, etc. The data requests of a research session are related either explicitly (e.g., by the user indicating that "all searches are related to a particular data collection until otherwise specified"), or can be implicitly related (e.g., related in time, topic, etc.). For example, all of a user's searches in a browsing session (e.g., from when the browser is opened to when it is closed) can be identified as being related. In another example, a user may designate a search as related to a collection or designate a period of time over which he will be researching for a particular collection (and thus, e.g., searches that occur over the period of time may be identified as being related).

The context data can include one or more of additional search terms, keywords, etc. that are generated by analyzing the behavior of the user over time (e.g., a user profile) and any data collections 106 associated with the user (e.g., accessible by the user or tagged as associated with the user's profile). The context data can be specific to the user requesting the data. The context data can be specific to the research task being completed by the user.

Single Access

In some implementations, the data processing system 200 assists the user by formatting the data request as needed for different data sources 104. For example, different repositories may have different search syntax or different application programming interfaces (APIs) for conducting searches on those repositories. The data processing system 200 formats a request for data to comply with the requirements of each of the data sources 104 that are available to the user, so the user may conduct comprehensive research from a single location (e.g., using a particular search engine, web portal, etc.). Thus, the data processing system 200 improves a scope of a data request (e.g., a search) by the user by ensuring that data is retrieved from all available data sources 104 and that the data retrieved is highly relevant to the research task at hand, given the context data of the research task available to the data processing system 200.

Data Storage

Additionally, the networked computing environment 100 includes data storage 106 configured to store data received in response to a data request (e.g., search results or any other content received in response to the request) by the user. Not all of the response data are stored in the data storage 106; rather, the data storage 106 stores data that is curated in data collections 206. In some implementations, the data storage that includes the data collections 206 is a separate computing system from the server system and/or client device 102 hosting the data processing system 200. In some implementations, the data storage is a part of the server system and/or the client device 102. In some implementations, the data storage 106 is distributed over several networked computing systems. In some implementations, the data storage 106 is a single computing system that is accessible by users through the data processing system 200.

Knowledge Discovery & Interaction

The data processing system 200 is configured to curate the response data that is received from the data sources 104 and store the curated data in the data collections 206 of the data storage 106. Data curation can occur automatically as a user sends requests for data, manually as a user interacts with the response data, or a combination of both. The curated response data are stored as one or more data collections 206. The data collection 206 is associated with the particular research being performed by the user, such as with one or more topics of the research or as designated by the user for a searching session. For example, one or more of the data collections 206 can be associated with a project that is defined by the user and includes all data interactions of the user during a given time frame, from particular data sources 104, from a particular client device 102, and so forth. In this way, the limits of what constitutes a research project can be defined by the user. Any activity by the user within the definition provided by the user (or designated by default settings of the data processing system 200 for a user, company, etc.) is analyzed and used to determine how the data of the data collections 206 are curated. For example, for a particular research session, if a user repeatedly selects data from a particular data source, data from that data source can be emphasized for that particular research session. In this example, the user may see more response data from that data source, and the data processing system 200 may weight response data more heavily from that data source for storage in a data collection 206 relative to response data from other data sources.

Personalized Ranking

The weightings for a particular data source are personalized to the particular research session as defined by the data processing system 200 and/or the user. In some implementations, the weightings for a particular data source can be personalized to a user over multiple research sessions or for a set of users (e.g., at a company that prefers a particular data source). For example, if users that are related (e.g., from a particular organization) typically save response data from a first data source more often than a second data source, the data processing system 200 can weight response data from the first data source more heavily than data from the second data source for users of the company. In some implementations, restrictions can be implemented for particular data sources, such as data sources 104 that are deemed unreliable, too costly, etc. such that data from restricted data sources 104 is not provided in response data to the user.

Access Control

Data that is curated into a data collection 206 can be available to other authorized users of the data processing system 200. The other users may have explicit permission to view/add to the data collection 206, such that the data collection is curated based on the behavior of a plurality of authorized users.

User Profiles

Each user of the data processing system 200 can develop a user profile associated with that user. The user profile includes data about the user. The user profile includes both data explicitly provided by the user (e.g., explicit feedback, answers to forms, etc.). The user profile includes data that is learned about the user, such as user preferences that are implicitly determined over time in response to monitoring user activity. The user profile specifies which data collections 206 are accessible to the user and stores metadata indicating the particular preferences for that user with respect to each data collection. In some implementations, the user profile can indicate different preferences for each data collection associated with the user profile (e.g., local preferences). In some implementations, the user profile can indicate preferences that are global to all research tasks completed by the user. As the user executes more request for data, the profile further develops for that research task (and globally, if applicable). As a user's preferences emerge (e.g., a user might prefer response data from a particular repository), the data processing system 200 adjusts which response data are presented to the user and/or how the response data are presented to the user. For example, the data processing system 200 can weight some response data more heavily than other response data and show that response data higher on a search results page, in larger font, show a greater portion of that response data (e.g., present a larger portion of a webpage or article), present a particular portion of that response data (e.g., show images rather than text), and so forth. The data processing system 200 can automatically curate the response data according the developing user profile.

Connectors

The user profile can further include any data that can be used to access data sources. For example, the user profile can include a registry of data sources to be accessed either passively while the user is viewing results data or in response to receiving a request for data. The data processing engine 202 can store credentials data associated with each of the registered data sources so that the data sources can be accessed without extra prompts being presented to the user. The registry can also include data describing the API of each data source, if applicable. The data processing engine 202 can use the stored data to translate requests for data into the proper syntax for the API of each data source.

Knowledge Collaboration

The data processing system 200 may identify similar users that are performing similar research sessions. In some implementations, the data processing system 200 may suggest that the users combine their data collections 206 into a single collection and work together on curating the data collections 206. In this case, the users can be different users working on similar research tasks, and the combining of the data collections 206 can reduce redundant research efforts. In some implementations, the users can both be from a common organization (e.g., a private organization), and the single collection can include confidential information.

Example Embodiment: Prior to Deployment

A practical example configuration of the data processing system 200 is described. This example is one particular embodiment for illustrative purposes, and aspects are further described in detail below. This example embodiment can be combined either in part or as a whole in any combination with the other features described throughout this disclosure. In an embodiment, an organization (e.g., a company) provides the data processing system 200 with a taxonomy consisting of a set of topics. Each topic has one or more associated examples that are used to seed the taxonomy. Prior to making the data processing system 200 available to individual users (e.g., employees) for various applications (e.g., query and response), the data processing system is configured to process the examples for each topic. The data processing system 200 uses the examples for each topic to create a respective classifier model for each topic. In an example, a classifier model can be built using a deep neural network (DNN) such as DL4J or other such DNN. In an example, a classifier model includes a set of preferred terms (PT) and non-preferred terms (NPT) for each topic. In an example, a preferred term can be "blockchain," while a non-preferred term can be "distributed ledger."

The data processing system integrates the single access search broker described previously with a set of sources 104. As stated previously, sources 104 include resources that can be queried such as Google News, SQL databases, search engines, and so forth. Generally, the sources 104 are licensed or operated by the company, offer subscriptions to content that the company purchases, and so forth. The sources 104 need not be related to one another in any way.

Continuing with this example, prior to deployment of the data processing system 200 for use by users, the data processing system 200 is configured to query each data source 104 using a sampling of the most common preferred terms of each of the defined topics. In an example, querying may be multiple parallel queries such as the same query using an "AND" and/or "OR" and/or phrase search to produce different results. The data processing system 200 collects (a) the number of results for each query and (b) the age of the most recent document, and (c) the classification fit of top documents returned from each query. The data processing system 200 determines how relevant a given source is for a given topic using the number of results returned. For example, a similarity function such as a cosine similarity of the returned documents to the topic model can be used. The similarity function can include additional weightings, such as a freshness boost or penalty.

The data processing system 200 generates a map of topics and associated data sources 104. The data processing system 200 can generate the map using vector space and/or graph approaches. In some implementations, the map is a table with data sources 104 each in rows, and topics in columns. In this example, at the cell intersecting between any source and topic is a normalized rating, such as a value from 0 to 1, where 0 indicates the source has no knowledge/data for the topic and 1 indicating it is excellent for that topic. In some implementations, the rating can be modeled using a more granular approach can include values such as 1-5.

Example Embodiment: During Deployment

The data processing system 200 is configured to recommend a topic for a given data resource that is included in the data storage 106, as described subsequently in greater detail. Continuing this example, an employee (or other user) collects a resource (e.g., a document) and does not immediately select a topic for it. The data processing system 200 classifies the resource against the generated map (e.g., model) for all topics. The data processing system 200 produces a list of similarity scores for each topic. In this example, if any score is over a minimum classification confidence threshold, the data processing system 200 recommends the resource be placed in one of those topics. In an example, a document may recommend topic number 3 with a confidence score of (0.91).

The data processing system 200 is configured for recommending a tag for a given resource, as subsequently described in greater detail. In this example, if only a single topic is recommended, or selected, then the top matching preferred term or non-preferred term for the resource are recommended as the tag for the resource. For example for a document #3, the data processing system 200 recommends non-preferred term #7 (with a score of 0.92) in for topic #3.

The data processing system 200 is configured to improve the topic model effectiveness using user collected information, as subsequently described. In this example, an employee collects a document and places it in a topic #3. The data processing system 200 uses this placement to improve the model associated with that topic.

Continuing with this example, the data processing system 200 is configured to sharing collected information through search functionality, as further described below. In this example, an employee #1 has collected documents D1, D2, and D3 in topic #3. The data processing system 200 has indexed all the information contained in D1, D2 and D3 under both topic #1 and the employee #1 as references. Here, D1, D2 and D3 are visible to all employees. In this example, employee #2 issues a query using the data processing system 200. If the query matches D1, D2 or D3, the data processing system 200 returns them in a result set.

The data processing system 200 is configured to sharing collected information by topic match, as subsequently described below in greater detail. Continuing with this example, the employee #2 issues a second query using the data processing system 200 for a third topic. The second query, however, does not directly match D1, D2 or D3. The data processing system 200 classifies the second query against all models for all topics. This produces a match against one or more topics, such as topic #3 (0.091) in this case. Because D1, D2 and D3 are linked to topic #3 (as earlier described), the data processing system returns them in the result set for the second query.

Continuing with this embodiment, the data processing system 200 is configured to selecting a best data source for a user query, as subsequently described. For example, the employee #2 issues a third query using the data processing system 200. The data processing system resolves the third query against collections 206 as previously described. The data processing system 200 also determines which data sources 104 are relevant to the third query. This requires that the data processing system 200 first get a match over the classification confidence threshold for one or more topics. This is done by looking up each source in the topic map. The data processing system 200 classifies the third query against all models for all topics. If this produces a match against one or more topics (e.g. topic #3 (0.091)), the source mapping is used as follows: sources over the valuable source threshold VST (likely 0.8) are ranked first; and sources over the minimum source threshold MST (likely 0.5) are ranked next. If no match is found against a topic, all sources are assumed to be relevant.

Example Embodiment: Improving Deployment

Continuing this embodiment, for each recommendation, the data processing system 200 provides a mechanism for allowing users such as employees #1 and #2 to provide feedback. The feedback can be binary 0/1 or a range such as 1-5. The data processing system 200 can use machine learning to periodically improve recommendations using these feedbacks, as follows: for each positive evaluation, the examples are added to the model for that topic called a positive baseline topic model (BT+N). For each negative evaluation, the data processing system 200 compares the example to the baseline topic model (BT) prior to adding any negative examples. Terms unique to the example that are not preferred terms or non-preferred terms in the baseline topic model are added as negative features to a new proposed model negative baseline topic model (BT-N). In this example, BT-N and BT+N are tested by the data processing system 200 to ensure they are both better than BT given the new examples. If they are, BT-N and BT+N are merged to BTN and if BTN outperforms BT, it replaces BTN. If not, a human editor is dispatched to analyze the issue and no changes are fed into the data processing system. These improvements flow through to both an augmented search function (described below) and selecting the best source applications of the data processing system 200 in terms of raw precision and recall.

Continuing with this embodiment, the data processing system 200 can include other self-improving features, as further described in detail below. For example, a self-aware document service can be included. This service, once created and trained with an existing collection(s) 104, can be configured to help all users by gathering, enriching, sharing and collaborating on the topics, items and users included in the system without being started, stopped or scheduled. This service ultimately is configured to expand connections in the system using open standards.

In this example embodiment, the service is instantiated with pre-existing collections of topics each with articles curated by users. Optionally, the users could be a given list, with topics identified for each user. The service is instantiated with the applications of the data processing system 200, as article body detection, topic classification, summarization, etc., described throughout this document. The service is instantiated with specific external services such as search engines, messaging interfaces messaging and publishing systems. The service is instantiated with rules about user or user roles, such as type X always sees abstracts, type Y always gets picture and headline, and so forth.

In this example, the service is driven by a long-running artificial intelligence (AI) governing routine that will pursue expansion and distribution of the given collections, as follows: initially the routine is configured to display the collections in an adaptive way, to all authorized users. Users might see different content in different format, depending on who they are and what the data the service includes about those users or their roles. On an ongoing basis, the routine gathers new content for each topic (as described above e.g., in the section called "Selecting the Best Source for a User Query"). The routine can also be configured to gather new topics the users have created and distribute the data to the users associated with or interested in those topics. In this example, the routine requests that the users comment on the articles. In this example, the routine notifies other users that comments are being posted. In this example, the routine asks top, bottom or random users associated with a topic to comment. In this example, the routine identifies new users and asks them to join the community, such as because they post on topic pages, or are found in training examples or newly gathered articles. For example, the service can email them an invitation—possibly after rule tests e.g. list of acceptable or un-acceptable domains, or human clearance is obtained.

Continuing with this example, the routine identifies new sources when several articles from the same source are curated, especially if it is a pay source that only provides an abstract or summary. The routine can email its own administrative staff asking them to add the source and providing the URL of the sales/licensing page. The routine can identifies new publishing routes, by discovering RSS feeds (or other sources) among collected content, and either connecting to them if they support an open publishing standard—or sending their content submission email a human built template with RSS link, emailing administrative staff of the routine, and/or requesting integration if all else fails. The routine automatically scales the service compute & storage capacity as required, possibly governed by a set of pre-defined rules.

Continuing with this example, the routine can be configured to aggregate all the new content, user activity and feedback. The routine improves engagement by using machine learning to predict which users will respond to requests to comment, and when the routine detects emerging events, it infers sub-topics and/or related topics, tests them by sampling with users, and classifies hypotheses into "proven", "wrong", "uncertain" over time. The routine improves all of the above based on user feedback as described previously.

Augmented Search

In some implementations, given a new topic and three example new documents collected to it by a user, the data processing system 200 can be configured to provide augmented search capabilities. For example, the data processing system 200 is configured to create a classification model from the three documents. If this model is at least similar (e.g., as determined by a valuable source threshold) to an existing model for a topic, the system is configured to use that model instead. If this model is not at least similar (e.g., as determined by a valuable source threshold) to an existing model for a topic, the data processing system 200 uses the technique described previously to identify the top sources (over VST) for the topic model. In this example, the data processing system 200 is configured to query each top source (over VST) using the preferred terms for the model. The data processing system 200 is configured to collect the top N "most relevant" terms and the top N "latest information" resources. The data processing system 200 is configured to de-duplicate the results, classify the first section of each document against the model, remove those that do not classify with at least the minimum source threshold, and rank documents and add to the collection, such as based on the following: preferred terms in the title of the resource or document; non-preferred terms in the title of the resource or document; all other resources.

Data Processing System

Figure 2:
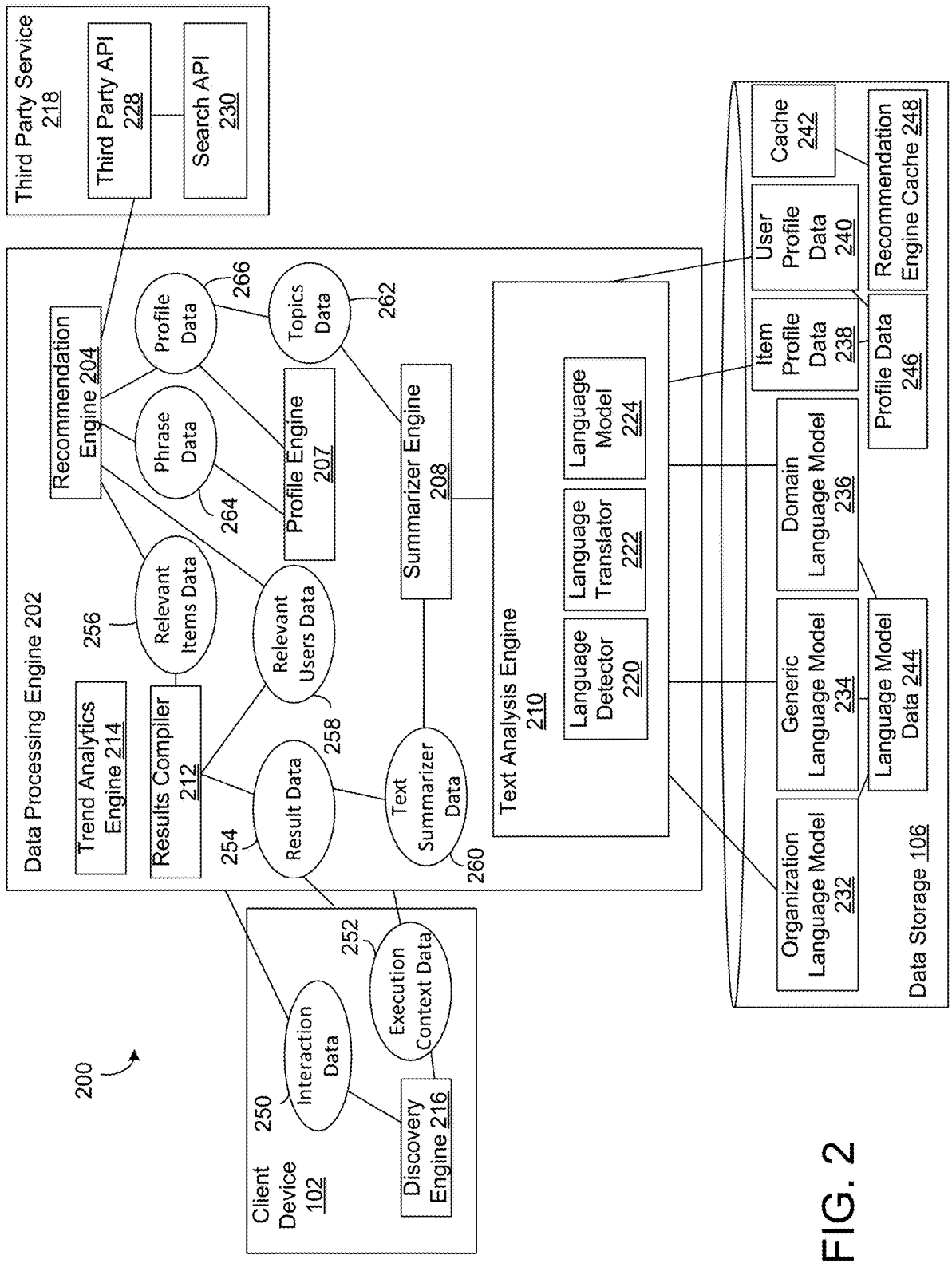
FIG. 2 shows an example data processing system.

Turning to FIG. 2, an example of a data processing system 200 is shown. The data processing system 200 shown includes a data processing engine 202 that is configured to execute the logic of the data processing system 200. The data processing engine 202 is configured to communicate with the data storage 106, the client device 102, and third party services 218. Though FIG. 2 show the data processing engine 202 as a stand-alone engine, the data processing engine can be a part of another application on the client device 102 or be a stand-alone application on the client device 102. In some implementations, each portion of the data processing system 200 is configured to be hosted on a single computing system, such as a server system. In some implementations, the data processing system 200 is configured to be hosted by a network of distributed computing systems. For example, the data processing engine 202 can be hosted on the client device 102, while the data storage 106 can be hosted on a server system (not shown). In some implementations, the data processing engine 202 is executed by the sever system in response to commands received from the client device 102, e.g., through a web portal, locally hosted application, etc.

The data processing engine 202 includes a recommendation engine 204, a profile engine 207, a summarizer engine 208, a text analysis engine 210, a results compiler 212, and a trend analytics engine 214. Each of these components is configured to send and receive data to/from one or more of each other in order to execute the functions of the data processing system 200. For example, the data processing engine 202 is configured to perform cross-lingual search and recommendations, configure contextualized searches (either of local systems like the state storage 106 or of one or more data sources 104), configure data collections 206, discover additional resources, discover other users and user profiles, and monitor user actions in the networked computing environment 100 to develop the user profile. While the data processing engine 202 is shown as divided into sub-engines and computing modules, the sub-engines and modules of the data processing engine 202 can function as a single logical program.

The recommendation engine 204 also recommends results data from other data collections 206 to the user's data collection when the results data from the other data collections are relevant to the current research session.

The data processing engine 202 is configured to receive requests for data from the client device 102, retrieve response data from one or more data sources 104, and send response data to the client device 102 for viewing by the user of the client device 102. The data processing engine 202 is also configured to monitor user activity to build the user profile and, in parallel, augment the user search and enhance the response data sent back to the client device 102 to include results that are of greater relevance to the user as shown by the user activity.

Interaction and Execution Context

The data processing engine 202 is configured to monitor user actions during a research session. For example, the data processing engine 202 is configured to monitor keywords (e.g., words, terms, phrases, etc.) used in searches. The data processing engine 202 can build a glossary of keywords entered by the user of the client device 102, and augment those keywords with related terms. The related terms may be synonyms, but may also be terms that are in a similar subject area as one or more of the keywords. For example, if the user enters a brand name (or several brand names) that relate to cars, the data processing engine 202 may augment the search with additional keywords that are related to car parts, car companies, car makes and models, and so forth. As the user continues the research session, the augmentation periodically (e.g., continually, at specified time intervals, in response to user actions, etc.) updates the glossary for that research session (and consequentially, for a related data collection 206). A portion of search augmentation can be performed by the text analysis engine 210, as described below.

The data processing engine 202 can receive interaction context data 250 (sometimes generally referred to as interaction data 250 herein). Interaction context data 250 includes data representing a user interaction with data that is presented to the user (e.g., in a user interface). For example, interaction data 250 can be indicative of which results data are interacted with and/or selected (e.g., clicked on) by the user of the client device 102 in response to presentation of the results data. Interaction context data 250 can also include how an input device (e.g., mouse cursor, touchscreen, etc.) is manipulated by a user in response to data presented to the user. The interaction data 250 can include data about the content with which the user interacts. For example, the interaction data 250 can specify a link selected from the results data, a position of the link in a ranked list of results of the results data, a data type of the selected content, and so forth. Other examples include indicating that the user of the client device 102 bookmarked a result in the response data, watched a video (or a portion thereof, which portion, etc.), viewed an image, downloaded content, ran an applet or other executable code, navigated to a series of results (e.g., what the context of a viewing a particular search result was), typically checks results in a particular order corresponding to their source or position on a webpage, how long the user views a result or series of results, whether the user navigates to a second result from a link included in a first result, and so forth.

In FIG. 2, interaction data 250 is sent to the data processing engine 202 and received by at least the recommendation engine 204. For example, if the user typically clicks on results data of a particular type (e.g., video data) for a research session, the data processing engine 202 can weight video results more heavily for the user's research session. In another example, if the user typically selects results data including a particular word or phrase (or group of related words or phrases per a language analysis), the data processing engine 202 can weight results that include those words or phrases (or words that are related) more heavily than other results data.

In another example, if a user lingers on a particular result (sometimes referred to herein as a resource) in the results data for a relatively long period of time (e.g., greater than a threshold amount of time), then the data processing engine 202 can weight results that are related to that search result more heavily in the future. For example, results from the same source as the particular result, results that include similar keywords as the particular result, and/or results that are the same type as the particular result may each be weighted more heavily in future searches by the user during the research session. If these results are curated into a corresponding data collection 206 (e.g., manually or automatically), those results can be ranked higher than other curated results in the data collection 206 so that they appear more prominently when the user views the data collection 206.

Other data can be received by the data processing engine 202 for monitoring user activity during a research session. For example, the data processing engine 202 is configured to receive execution context data 252 that represents the environment of the interactions of the user (e.g., interactions represented in interactions data 250). For example, the execution context data 252 can include data describing a hardware and/or a software environment in which content is interacted with by user. For example, the execution context data 252 can include an identification of an operating system of the client device and/or server system, an identification of a browser being used to access networked content, details about a physical location of the client device, orientation of the client device (e.g., viewing a video in landscape or portrait mode for a tablet, mobile device, etc.), a type of the client device (tablet, laptop, mobile phone, wearable, etc.), display settings of the client device (e.g., brightness, volume, contrast, etc.), and so forth. The execution context data 252 can include data describing other information about the interactions, such as time of day, display language settings, and so forth.

Content-Based Search

The interaction data 250 received by the data processing engine 202 is sent to at least the recommendation engine 204 for generating requests for additional data from the one or more data sources 104 (e.g., from third party service 218). The additional data can include any resource available from the data sources 104 and the data storage 106. The additional data can be selected based on a weighting system that relates the interaction data 250 to the additional data based on a plurality of metrics of the interaction data 250. The plurality of metrics are identified by the data processing engine 202 by extracting one or portions of one or more resources identified in the interaction data 250 (e.g., of the results data that the user interacted with as described above). The one or more portions of the resources identified in the interaction data 250 can include a portion of content from a resource of the results data and/or metadata associated with the resource.

The extracted data is parsed to identify one or more metrics of the extracted data that can be used to relate the resource to additional data (e.g., additional resources) that are related to the results data. The relationship between the resource to the additional data can be determined over time (e.g., using a machine learning process) by developing a set of weights for each metric as described below. In some implementations, the one or more metrics can include a data type of the extracted data, a data source of the extracted data, one or more topics represented in the extracted data, a language type represented in the extracted data, and one or more links to an additional resource in the extracted data, among others.

Personalized Recommendations

For each action or combination of actions taken by a user with respect to a resource/result of the response data, the data processing engine 202 can adjust a weighting associated with that resource. In some implementations, the weighting can be used to determine whether the result is automatically added to the data collection 206 corresponding to the research session of the user. For example, the weight can be incrementally increased as a user interacts with a resource, and the resource can be added to the data collection 206 when the weighting value exceeds a threshold. In such a weighting regime, the threshold can be dynamic so that results are added and removed from the collection over time as the profile develops, retaining only the most relevant results for the data collection 206.

For example, the threshold may change so that a particular percentage of items are retained in the data collection 206. When a new result is more relevant than an existing result in the data collection 206, the new result can be added and an older, less relevant result can be removed. For example, results in the data collection 206 that have not been accessed over time can gradually be weighted less by the data processing engine 202, and eventually removed from the data collection 206. In some implementations, results added to the data collection 206 are included until the user affirmatively removes the result from a collection (or deletes the data collection entirely). As described below, in some implementations, results in the data collection 206 can be presented in a particular order based on their weight values (e.g., results having greater weights are ranked higher and appear closer to the top of a collection when viewed).

In some implementations, the threshold is static. When a weighting value associated with a result exceeds the threshold, the result is automatically added to the data collection 206. The item remains in the data collection until the user removes it manually. In some implementations, the data collection 206 can be capped to be a particular size (e.g., size in data storage capacity and/or the number of results stored in the data storage 106). When the cap is reached, results can be removed/replaced based on their associated weight values.

In some implementations, weight values assigned to results are based on the type of interaction with the result by the user. For example, if a user views a portion of a video, the video can receive an increase to its weight value. If the user views the entire video, the video can receive a maximum weight that is related to user viewing of the video, and if the weight value exceeds a threshold, the video is added to the data collection 206. In this example, a video that is viewed for 10% of the video's length may not be added, but a video that is viewed more than 75% of its length is added to the data collection 206. In some implementations, the portion of the video that is viewed is segmented and added to the data collection 206, the video may be tagged to begin at a timestamp of where the user started watching, or some other modification can be made to the video when it is stored in the data collection 206.

The recommendation engine 204 includes logic for recommending additional results to include in the results data. The recommendation engine 204 can use relevant items data 256 (including which results are relevant by the weightings system described above), phrase data 264 (indicating keywords and phrases and associated weight values), topics data 262 (indicating subjects and/or groupings of keywords and their associated weight values), and profile data 266 (including data generated by the profile engine 207) to recommend results.

User Discovery

The recommendation engine 204 can also recommend other users that may be conducting similar research as the user of the client device 102. The recommendation engine 204 can generate relevant users data 258 that includes a list of similar users (e.g., within an organization) so that the user of the client device 102 can reach out to the other users for collaboration or some other purpose.

The recommendation engine 204 can communicate with a third party service 218. The third party service 218 can include any third party repository, research organization, website, publisher, etc. that provides results data in response to a search query. The recommendation engine 204 can interface with the third party API 228 to send commands to the third party service 218 that are properly formatted to receive results data from the third party service. For example, the third party API may specify a particular query format required for searches on the systems of the third party service 218. For example, the third party service 218 can include a search API 230 used for formatting search queries.

The profile engine 207 is configured to update the user profile (e.g., user profile data 240) with profile data 266 as the user interacts with results data provided by the results compiler 212. The profile engine 207 can provide the profile data 266 to the recommendation engine 204 when the augmented search query is being generated by the recommendation engine 204. For example, as described above, the profile engine 207 can receive data indicative of user activity and determine which results are more relevant to the user for a data collection 206 than other results. In some implementations, a separate engine (e.g., a biographer engine, not shown) can receive the data indicative of the user activity and report the data to the profile engine 207. The profile engine 207 can receive the data describing the user interactions with the results (referred to herein as the interaction context data 250) from the client device 102. In some implementations, the profile engine 207 also receives the interaction data 250 from the client device 102 for building the user profile data 240. In some implementations, other components of the data processing engine 202 may also receive the interaction data 250. The profile engine 207 manages user profiles and can send data from the user profiles to the recommendation engine 204 to assist the recommendation engine in providing augmented results data to the user.

Text Summarization and Analysis

The summarizer engine 208 is configured to summarize data received from the text analysis engine 210.

The text analysis engine 210 includes a language detector 220, a language translator 222, and one or more language models 224. The text analysis engine is configured to determine sets of keywords, phrases, etc. that are related to one another. For example, keywords can be related by subject matter (e.g., by topic), as synonyms, antonyms, as part of a common result or resource, and so forth. For example, the text analysis engine 210 can determine that the appearance of two particular words are correlated in a document or other resource, and create a model in which the two words are related. For example, the text analysis engine 210 might determine that the words "car" and "Ford®" appear together frequently, and thus associate the word "car" with the word "Ford®."

Cross-Lingual Search

The language detector 220 is configured to determine what language(s) the user prefers, and may initiate an augmented search for results that are in a language other than the primary language being used by the user of the client device 102.

The language translator 222 is configured to translate a request for data (e.g., a search query) into one or more additional languages. In addition, the language translator 222 is configured to translate the results data into a language preferred by the user (or other users sharing the data collections 206 in which the results data are stored). The language translations can be used for performing searches and retrieving data from the data sources 104.

Language Models

The language model 224 includes one or more models of languages being used for search and retrieval of the results data. The language model 224 can include associations of words with one another for a language. The language model 224 can include syntax rules for respective languages. The language model 224 can enable the data processing engine 202 to parse requests for data to return results data that reflect the meaning of the request rather than results that simply include the words specified in the request.

Result Compiler

The results compiler 212 is configured to package the results data into a format that is acceptable to the client device 102. For example, the results data can be formatted based on hardware requirements of the client device 102, software requirements of the client device 102 (e.g., what kind of browser or application the client device 102 is using to send and receive data), network requirements, and so forth. For example, the results compiler 212 can compile results data into a downloadable package that is received and opened by the client device 102.

Data Storage

The data storage 106 includes an organization language model 232, a generic language model 234, a domain language model 236, language model data 244, item profile data 238, user profile data 240, a cache 242, profile data 246, and a recommendation engine cache 248. The data storage 106 stores the data collections 206 for each user profile.

The organization language model 232 includes a language model that is particular to an organization (e.g., a company). For example, different words may have different meanings based on the context of the company for which the word is commonly used. Organizations can define their own terms and relationships between the terms for use by members of the organization in the data processing system 200.

The generic language model 234 comprises a counterpart language model to the language model 224 of the data processing engine 202. The generic language model 234 can form the basis of the domain language model 236, which weights keywords and terms based on usage by one or more users of the data collection 206. For example, the domain language model 236 includes relationships between keywords, phrases, etc. that are particular to a data collection 206. The domain language model 236 is developed over time as the research session matures.

The item profile data 238 includes data for one or more items (e.g., results) stored in a data collection 206. The item profile data 238 can include weighting values for different results that have been curated into the data collections 206. The item profile data 238 can include the data of the results themselves (or respective portions of the results). The user profile data 240 includes data gathered from user interactions (e.g., interaction data 250 and execution context data 252). The user profile data 240 is used to generate weighting values for one or more results in the data collections 206 as described above.

The cache 242 and recommendation engine cache 248 each provide storage for items (e.g., results) being weighted or otherwise processed by the data processing engine 202. For example, if a video snippet is being generated, the video can be stored in the cache 242 before being altered for presentation to the user through the client device 102 or before storage in the data collections 206.

Knowledge Trends

The trend analytics engine 214 is configured to identify trends in activity by the user or similar users, and either weight results data or suggest additional results data. The trend analytics engine 214 can identify gaps in research across many data collections 206 and by many users and suggest results data that fill the gaps. The gaps can be identified by analyzing prior requests for data (e.g., prior search queries), language models, and other data to determine if highly relevant search terms have been omitted or portions of data that may be relevant have been ignored or overlooked by the user.

Figure 3:
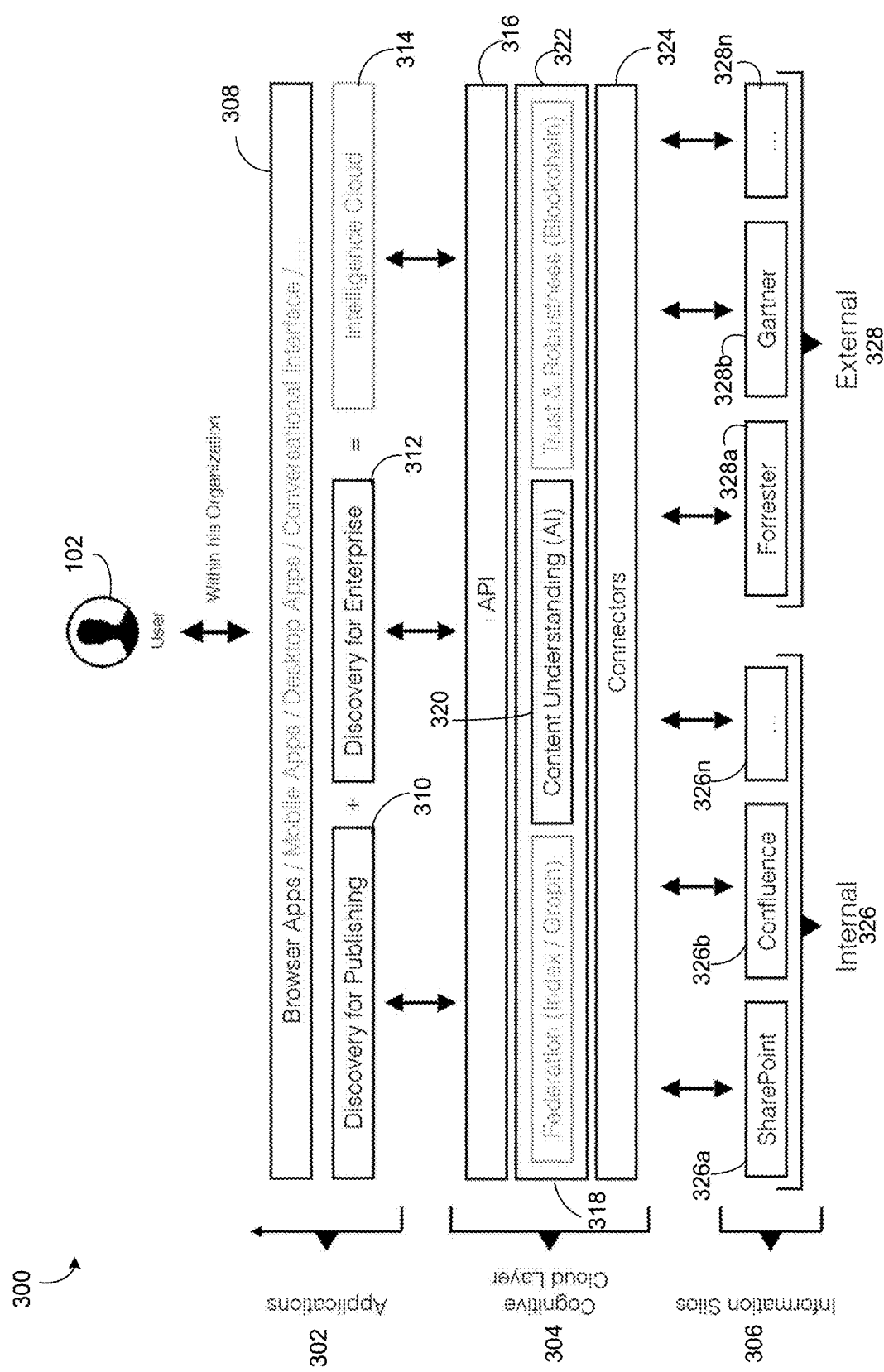
FIG. 3 shows an example application of the data processing system.

Turning to FIG. 3, an example application 300 of the data processing system 200 is shown. A user (e.g., client device 102) interacts with one or more applications 302. The applications 302 include an interface 308, which can be a part of a browser plugin, browser application, web portal, mobile application, desktop application, or other user interface. The applications 302 can include a discovery for publishing application 310 and a discovery for enterprise 312, which together form an intelligence cloud 314 of the data processing system 200.

The applications 302 that are executed by the client device 102 (e.g., either directly or indirectly over a network) interface with an API of a cognitive layer 304 of the data processing system 200. The cognitive layer 304 includes the content intelligence 320 engines described above in the data processing engine 202, as well as a federation index or graph 318 and a trust and robustness module 322. The trust and robustness module 322 can implement various security measures, including encryption, to ensure that the data collections 206 remain secure from unauthorized users.

The connectors 324 interface the cognitive layer 304 with the data sources 104, which are labeled as information silos 306. The information silos 306 include discrete data sources 104 which may have no relationship to one another and which may each have different search syntaxes, API functions, etc. For the example of FIG. 3, the information silos 306 include both internal sources 326 and external sources 328. For example, internal sources 326 can include SharePoint 326*a*, Confluence 326*b*, and any number 326*n* of other sources that are internal to an organization that may be sharing data collections 206 and other data with others within the organization. The external sources 328 can include Forrester 328a, Gartner 328b, and any number 328n of other data sources 104 that are external to the organization network.

Figure 4:
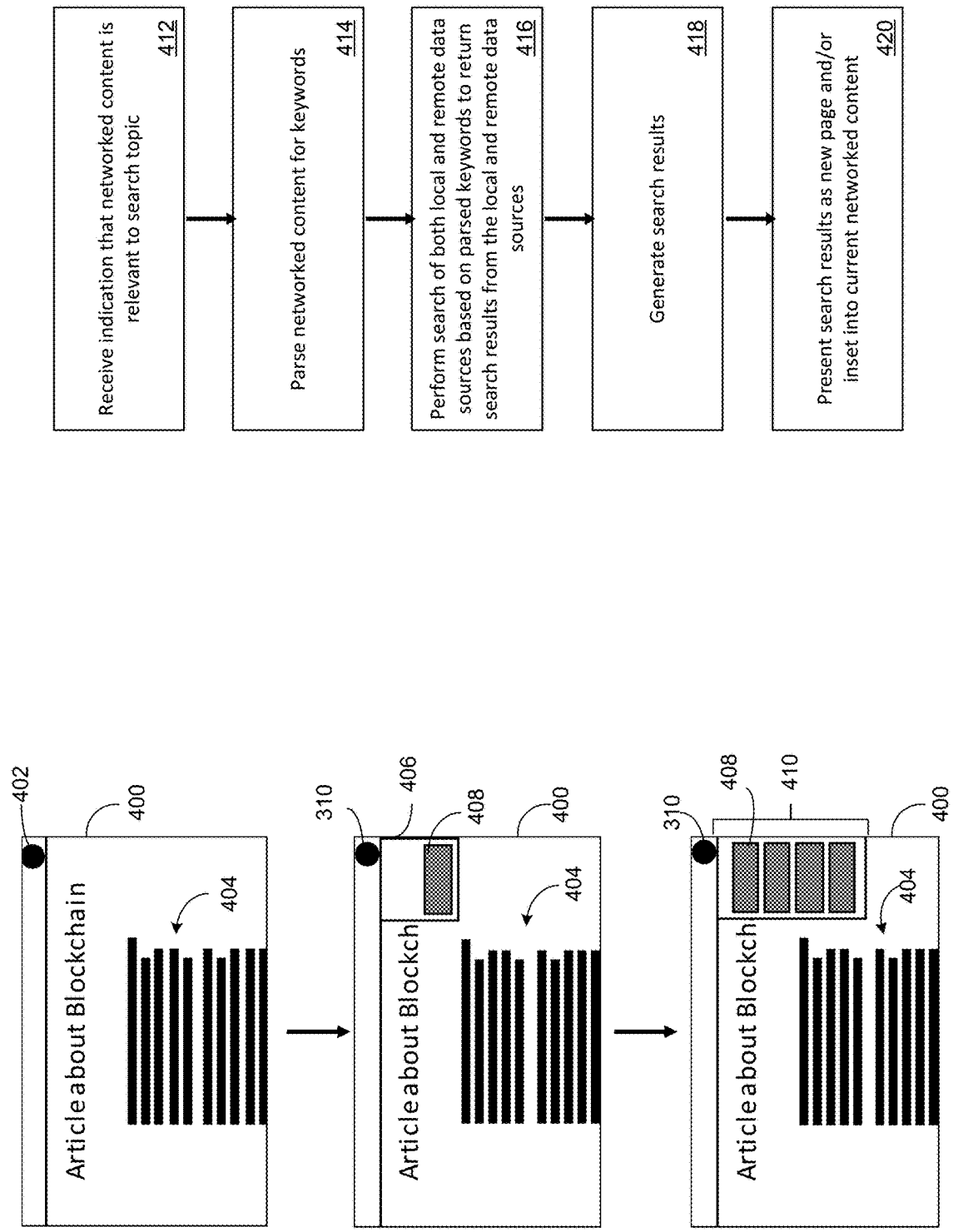
FIG. 4A shows an example series of actions with a user interface.
FIG. 4B shows an example process of corresponding actions for interacting with the user interface of FIG. 4A.

FIG. 4A shows a series of actions with a user interface 400, and FIG. 4B shows a process of corresponding actions for interacting with the user interface. The user interface 400 is presented to the user (e.g., on the client device 102) and enables the user to perform contextualized searches and other requests for data from the data processing system 200. The user interface 400 includes a control 402 which a user can interact with (e.g., select, click, activate, etc.) to manually add a result 404 (e.g., content) or portion thereof to a data collection 206. When a result 404 is manually added, its weight can set to a maximum setting indicative of high relevance compared to other results.

The user can interact with the control 402, which prompts a discovery window 406 to appear. The user may select the control 402 to add the entire result 404 to the data collections 206, and the result 404 shows up as an icon 408 in a discovery list 410 that is overlaid on the content being viewed by the user on the client device 102. The user can select a portion of the result 404 (e.g., by highlighting, etc.), and then select the control 402 to add the portion of the result to the data collections 206.

After the user has added several results to the data collections 206, or if several results are automatically added as described above, the discovery list 410 includes a link to the result 404 as well as other results that have been added to the data collections 206. The other results shown in the discovery list 410 can be the most recently added, the most relevant, a combination of the two, or listed according to some other metric.

Turning to FIG. 4B, an exemplary process for augmented search is shown. The data processing system 200 receives (412) an indication that the networked content (e.g., result 404) is relevant to the request for data (e.g., a search topic). The data processing system 200 parses (414) the networked content for keywords. The data processing system 200 performs (416) a search of both local and remote data sources 104 based on the parsed keywords to return search results from the local and remote data sources 104. The data processing system 200 generates (418) augmented results and presents (420) the results as a new page or as an inset into the current networked content (e.g., in the discovery list 410). The results shown in the discovery list 410 can include results that were previously stored in one or more data collections 206.

In some implementations, a local data source generally refers to a data source that is accessible by the client device and other client devices that have a relationship to the client device (e.g., connected on a local network), but that is not accessible by every client device (e.g., client devices not connected on a local network) in a networked environment. For example, a local data source can include a webmail server, an intranet resource (e.g., for a company, a university, etc.), local storage on a client device, cloud storage requiring a log in (e.g., a Google doc, a Dropbox account, etc.), a local repository (e.g., a version control repository), a local calendar (e.g., company calendar), and so forth. The local data sources can be behind a firewall or other security measure and thus be inaccessible from remote sources. In some implementations, the local data sources are sources that are not indexed by conventional search engines (e.g., public search engines) and that are accessible to the data processing system. The local data sources are searched by the data processing engine 202 of the data processing system 200 to provide relative results (e.g., resources). In some implementations, the local data source can be a portion of data storage 106.

In some implementations, a remote data source can include a data source that is accessible by the client device and at least some other client devices that have no relationship to the client device (e.g., client devices that are not connected to the client device on a local network). The remote data source is not necessarily accessible by every client device, and is not necessarily indexed by a search engine. For example, the a remote data source can include a semi-public repository (e.g., JSTOR, Forrester, etc.), a public repository that requires authentication (e.g., a U.S.P.T.O. patent database), a subscription-based research repository (e.g., Westlaw), and so forth. A remote data source can also include a publisher of content such as a website, either subscription-based (e.g., NY Times, Economist) or otherwise.

Generally, for remote and local source that require authentication (e.g., secured data source), the data processing engine 202 can retrieve credentials from the client device and use the credentials to access the resources of the secured data source. The credentials can be received by the data processing engine 202 in advance of the request for data (e.g., through an application on the client device) or received at the time of the request for data (e.g., along with the request for data from the client device). The data processing engine 202 is able to search the secured data sources in addition to unsecured data sources and retrieve the results data. In some implementations, the credentials data can be stored in a local storage in a user profile. The credentials data can be retrieved from the local storage when a user submits a request for data and sent along with the request for data from the client device to the data processing engine 202. In some implementations, the data of the user profile and the credentials data are stored in the data storage 106.

In some implementations, the data processing engine 202 translates the request for data as required to retrieve results by one or more third parties. As discussed above, translating the data request can include configuring the data request to conform to an API of one or more third party services 218, which can be remote or local data sources.

Figure 5:
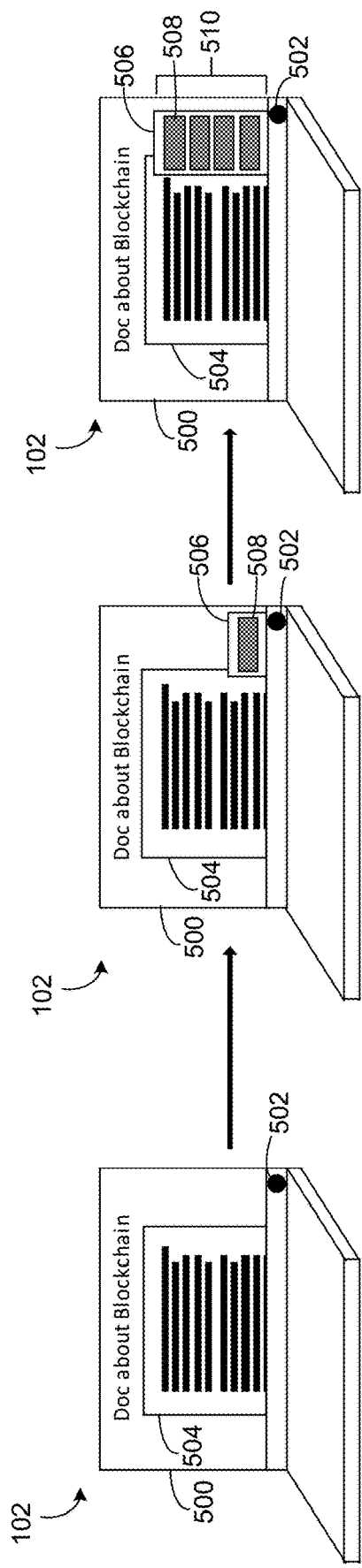
FIG. 5 shows an example user interface for a client device.

Turing to FIG. 5, a user interface 500 is shown for a client device 102. The user interface 500 is presented by an application installed on the client device 102. The application can include some or all of the data processing system 200. Similar to the process of FIGS. 4A-4B, a user selects a control 502 to add a result 504 to a data collection 206. When the control 502 is selected, the result 504 can be added to a list 506 of discovered results and be shown as an icon 508. As additional results are added to the data collection 206, a discovery pane 510 can show the list 506 of results using one or more criteria described above.

Figure 6:
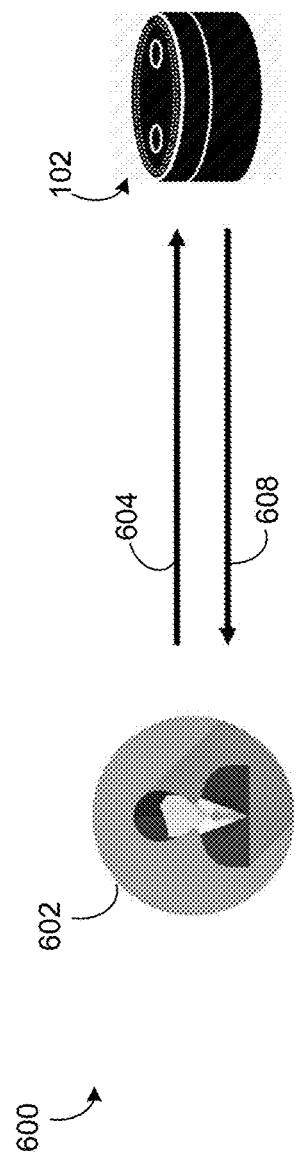
FIG. 6 shows an interaction with the data processing system of FIG. 2.

Turning to FIG. 6, an interaction 600 with the data processing system 200 is shown for a client device 102 comprising a voice assistant. A user 602 can express a data request 604 as a voice command. The client device 102 can interpret the request using voice to text technology, and return results data 608 as audio data.

Figure 7:
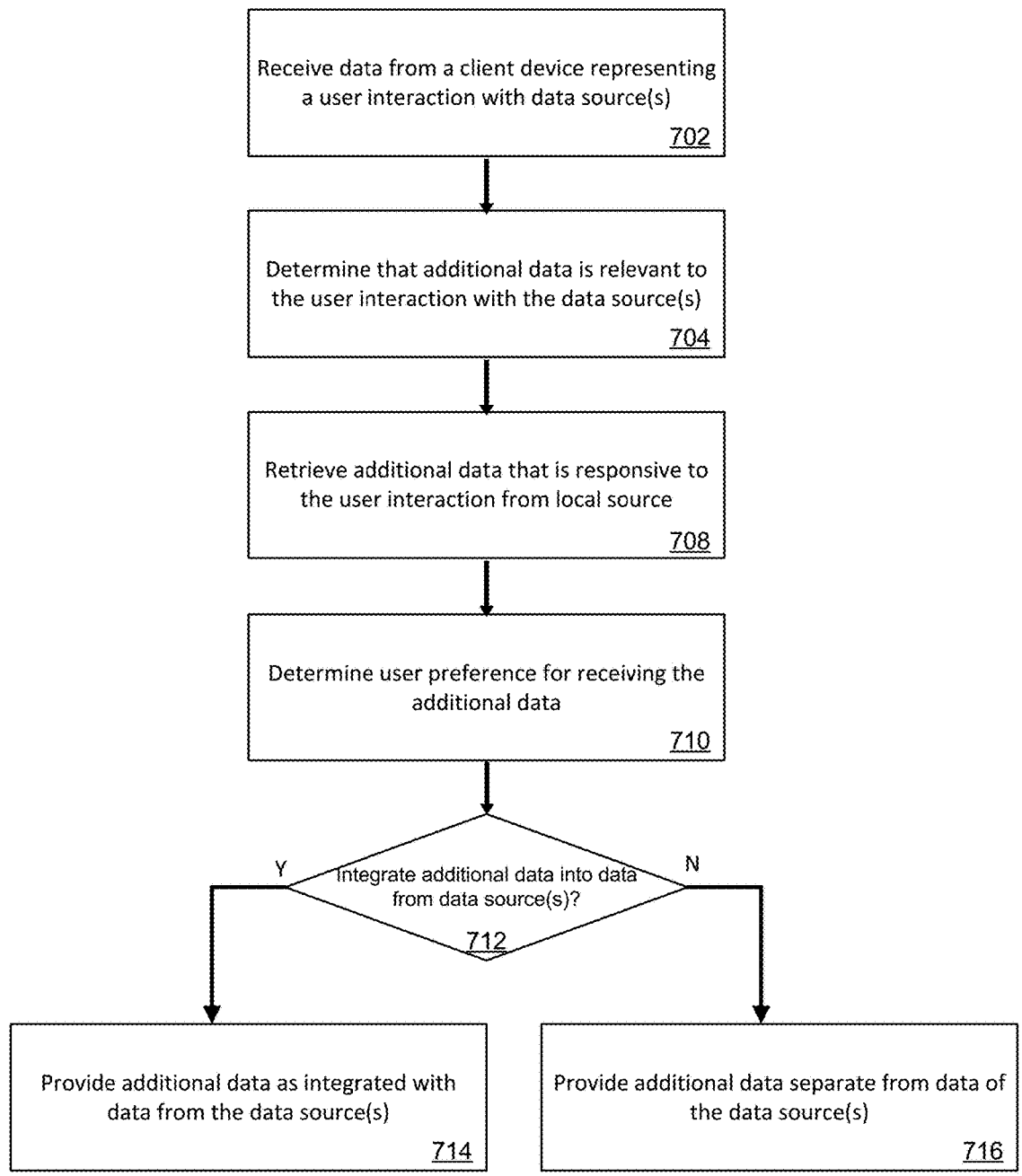
FIG. 7 shows an example process for responding to a request for data from a client device by the data processing system of FIG. 2.

FIG. 7 shows an example process for responding to a request for data from a client device 102 by the data processing system 200. The data processing system 200 receives (702) data from the client device 102 representing a user interaction with one or more data sources. The data processing system 200 determines (704) that additional data, such as additional results data, are relevant to the user based on the user interaction with the one or more data sources.

Figure 8:
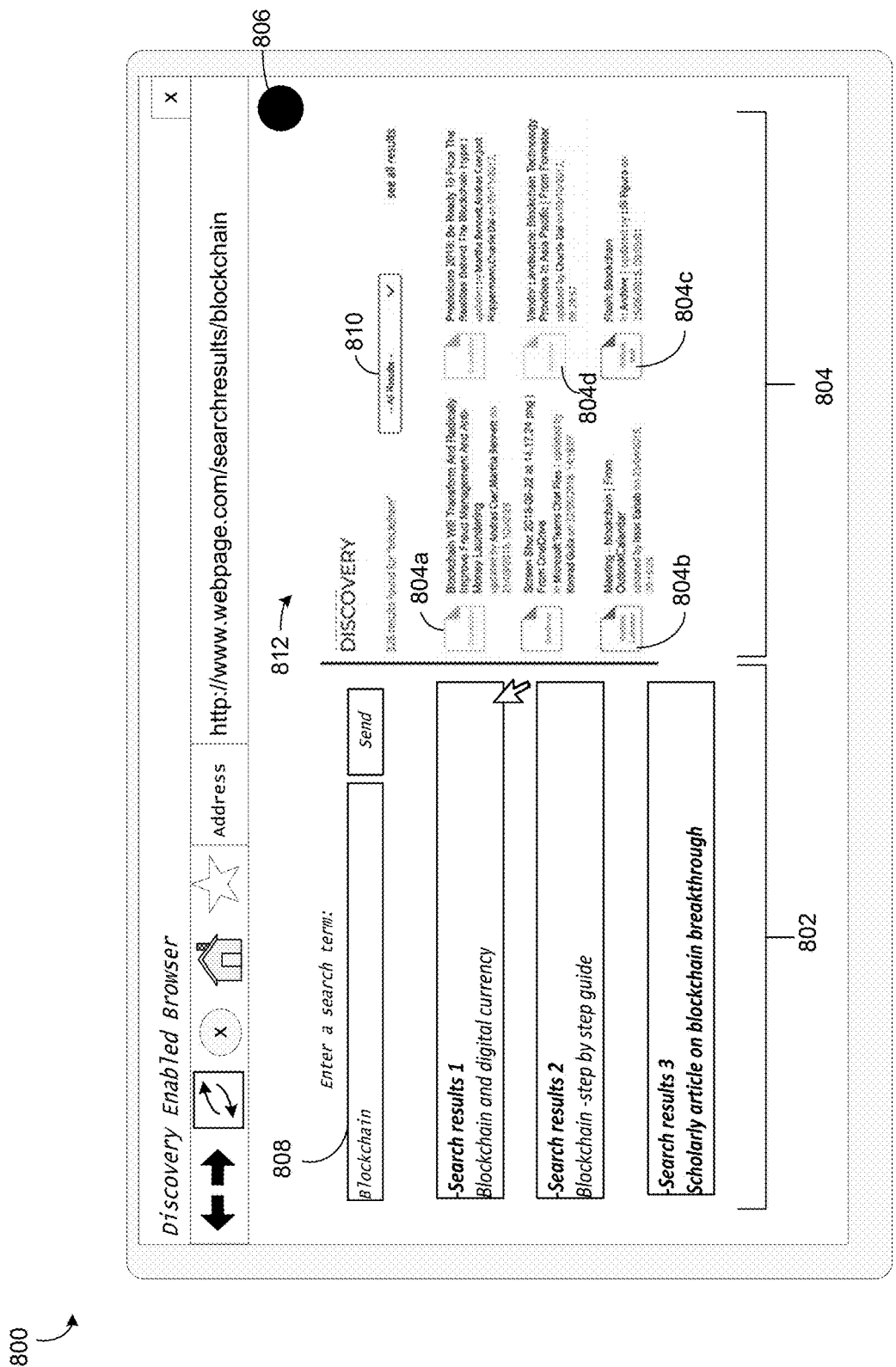
FIGS. 8-10 show an example user interfaces of a client device.
Figure 9:
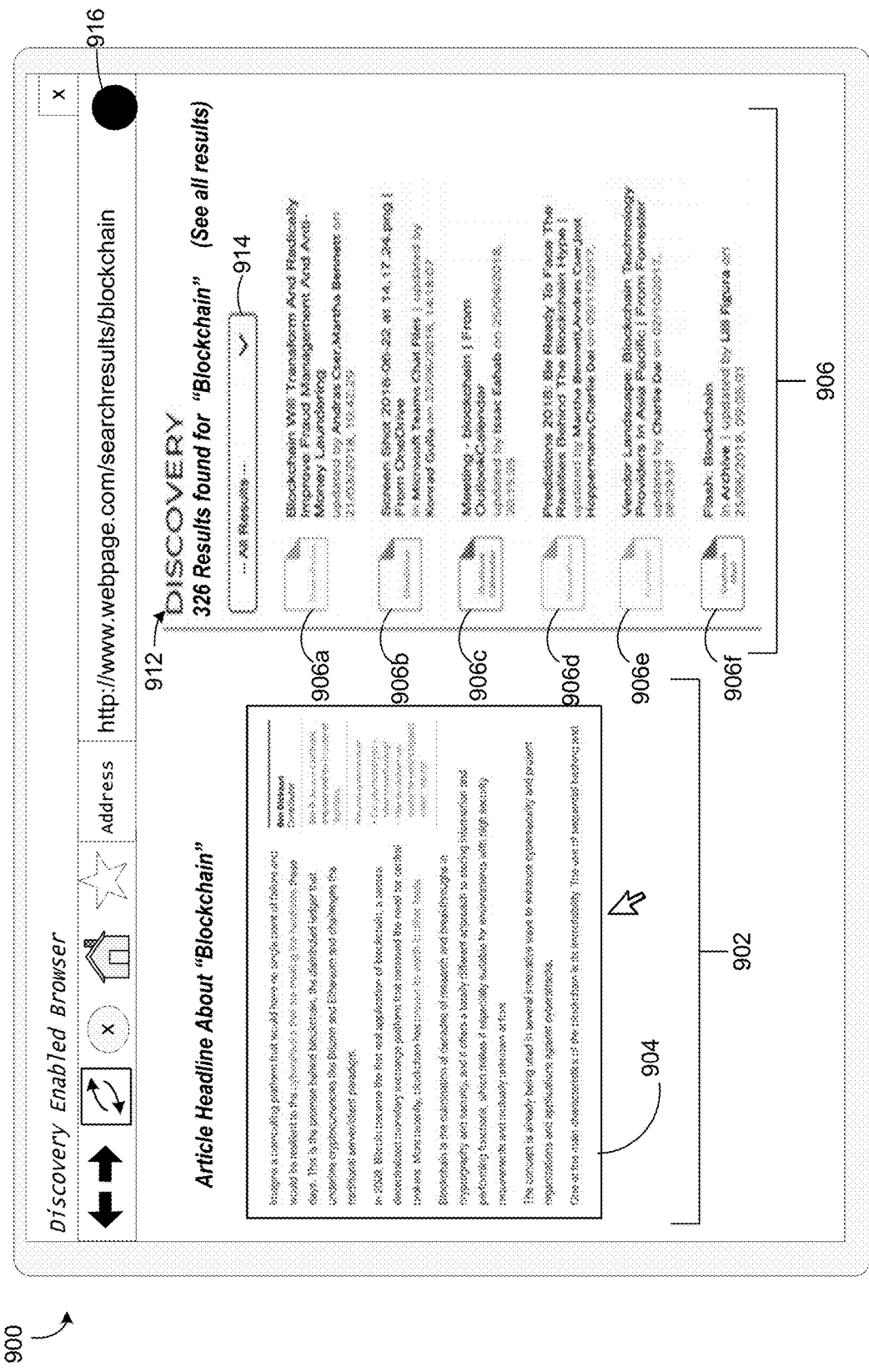

The data processing system 200 retrieves (706) the additional data that is responsive to the user interaction from a local data source (e.g., a data collection 206). The data processing system 200 determines (710) a user preference for receiving the additional data (e.g., a presentation style and/or format, etc.). The data processing system 200 determines (712) whether to integrate the additional data into the data from the data sources (e.g., result data). If the additional data is to be included, the data processing system 200 provides (714) the additional data integrated with the data from the data source(s) (e.g., in a discovery pane as shown in FIGS. 8-9). If the additional data is not to be integrated with the data from the data sources, the data processing system 200 provides (716) the additional data as separate from the data form the data sources (e.g., as snippets shown in FIG. 10).

FIG. 8 shows an example user interface 800 of the client device 102. The user interface 800 includes a browser window. Search results 802 from a conventional search are shown on a left side of the user interface 800. A search bar 808 enables a user to enter requests for data into the browser. A discovery pane 812 shows augmented results 804 from data collections 206 or other data sources 104, both remote and local, that the search engine does not return. The augmented results 804 include response data that is found to be relevant as described above. The user can interact with a control 810 to see more augmented results. The user can interact with a control 806 to add the current page of search results itself to a data collection 206. In the example illustrated in FIG. 8, the augmented results 804 include a document 804a that is updated by authors related to the user, a OneDrive document, a calendar document 804b hosted by a local email server for an organization of the user, an archived email 804c, and a Forrester report 804d that is accessible to the user. While six augmented results are shown, other numbers of results can be shown. The augmented search results 804 can be said to be juxtaposed with the search results 802. In some implementations, the augmented search results are presented as mixed together with the search results.

FIG. 9 shows an example user interface 900 of the client device 102. The user interface 900 includes a browser window. An article 904 selected by the user is shown on a left portion of the user interface 900. A discovery pane 912 shows augmented results 906 from data collections 206 or other data sources 104, both remote and local, that are related to the article 904 being viewed by the user. A control 916 enables the user to add the article 904 to the data collections 206. A control 914 enables the user to view additional articles.

The augmented results 904 include results data that is related to the article, as determined by the data processing system 200 as described above. For example, the article is about blockchain technology. The augmented results 904 include a SharePoint file 906a, a screenshot 906b from OneDrive, an Outlook meeting invitation 906c, another SharePoint article 906d authored by the same author as article 906a, a Forrester report 906e on blockchain vendors, and an email message 906f about blockchain. While six results 906 are shown, the number can be more or less as desired.

Figure 10:
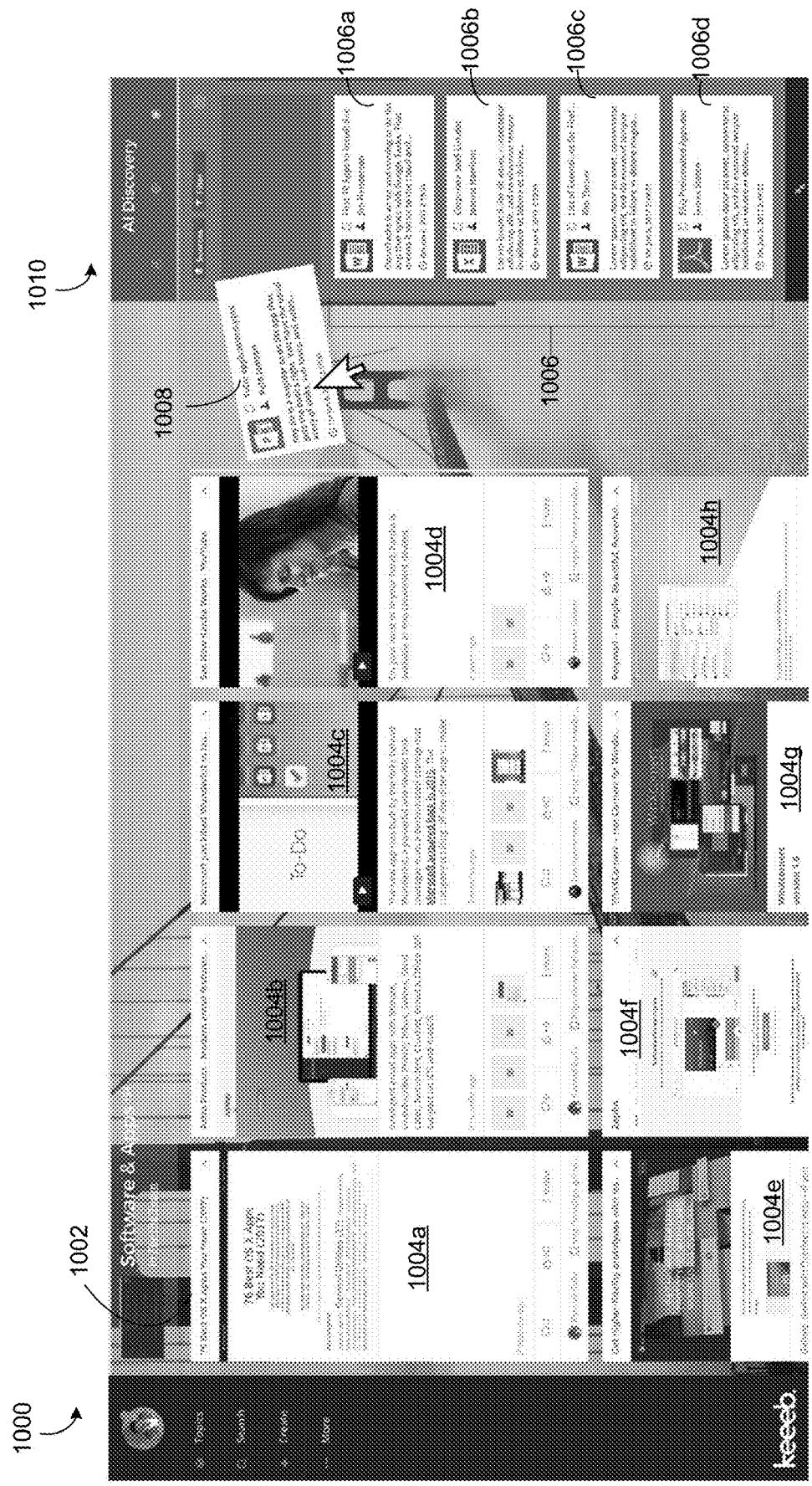

FIG. 10 shows an example interface 1000 of the data processing system 200 including a plurality of snippets 1004 from results data. Snippets can be selected based on user interactions with the results data, relevance data for the results, and the user profile data as described above. For example, if a user views videos in each result, the snippet can include only the video or the portion viewed by the user in the data collections 206. The snippet can show the relevant collections of text (e.g., relevant paragraph(s)) of an article that the user viewed or hovered over while interacting with results data. Each snippet 1004a-f can be accompanied by a header 1002 including a title of the snippet, either generated automatically (e.g., including keywords) or manually by the user.

To view snippets, a user can drag a result 1008 from the discovery list 1010 to the viewing pane of the user interface 1000. The discover list 1010 can include one or more results 1006 that are related to the snippets viewed. The results 1006a-d can be ranked based on the relevance to the snippets viewed or using similar criteria.

Figure 11:
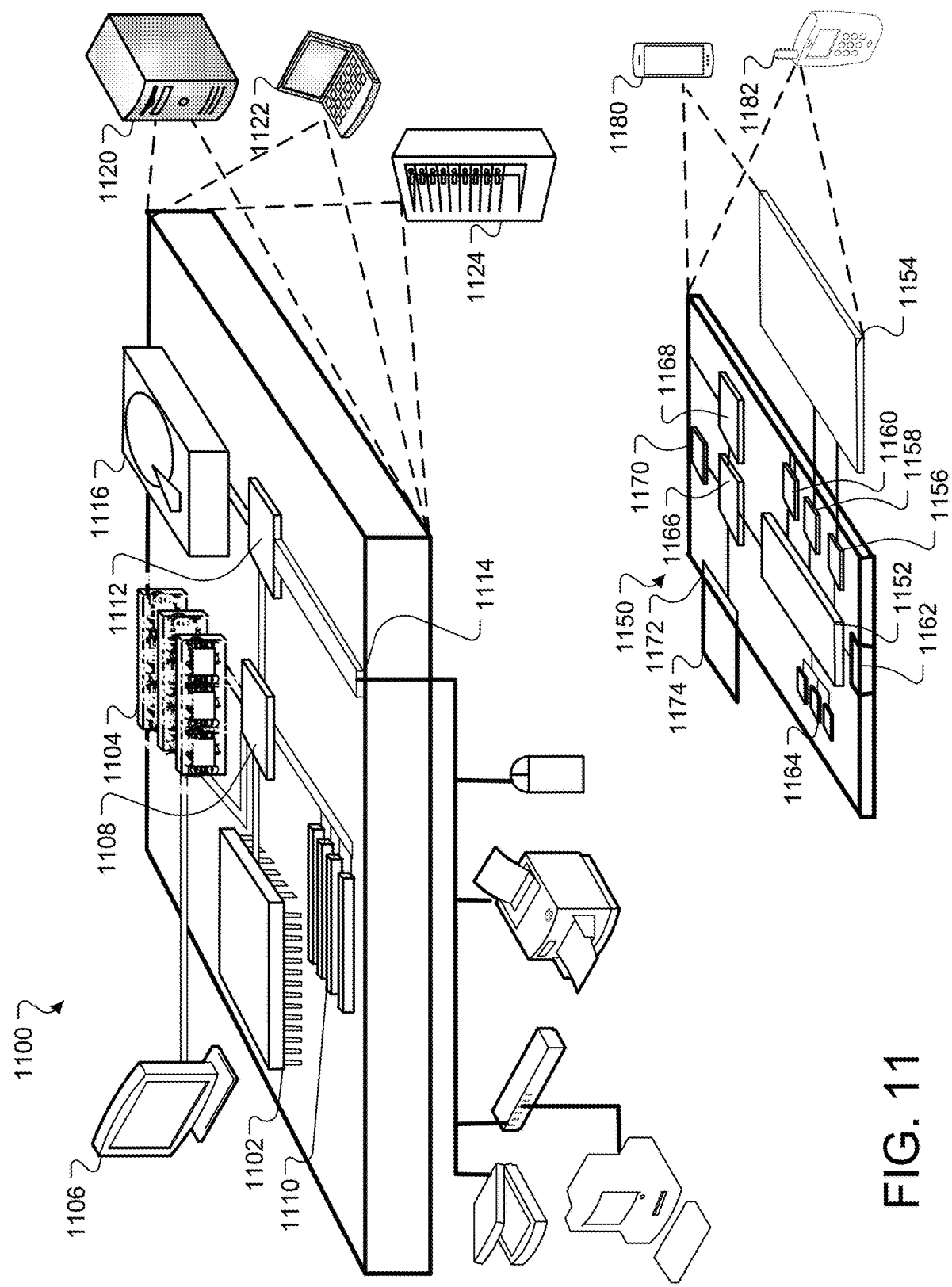
FIG. 11 shows a block diagram of example computing devices.

FIG. 11 includes a block diagram of computing devices 1100, 1150 that may be used to implement the systems and methods described in this document, as either a client or as a server or plurality of servers. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smartphones, and other similar computing devices. Additionally computing device 1100 or 1150 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the subject matter described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high-speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT (Thin-Film-Transistor Liquid Crystal Display) display or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152 that may be received, for example, over transceiver 1168 or external interface 862.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1182. It may also be implemented as part of a smartphone 1180, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

The features described is implemented in digital electronic circuitry, or in computer hardware, firmware, software, or in combinations of them. The apparatus is implemented in a computer program product tangibly embodied in an information carrier, e.g., in a machine-readable storage device for execution by a programmable processor; and method steps is performed by a programmable processor executing a program of instructions to perform functions of the described implementations by operating on input data and generating output. The described features are implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that is used, directly or indirectly, in a computer to perform a certain activity or bring about a certain result. A computer program is written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory is supplemented by, or incorporated in, ASICs (application-specific integrated circuits).

To provide for interaction with a user, the features is implemented on a computer having a display device such as a CRT (cathode ray tube) or LCD (liquid crystal display) monitor for displaying information to the user and a keyboard and a pointing device such as a mouse or a trackball by which the user provides input to the computer.

The features are implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system includes clients and servers. A client and server are generally remote from each other and typically interact through a network, such as the described one. The relationship of client and server arises by virtue of computer programs running on the respective computers and having a client-server relationship to each other.

A number of embodiments of the data processing system 200 have been described. Nevertheless, it will be understood that various modifications may be made without departing from the spirit and scope of the disclosure. Accordingly, other embodiments are within the scope of the following claims.

What is claimed is:

1. A method for augmenting a request for data, the method comprising:
    receiving a query requesting data from one or more data sources, the query configured to cause a plurality of searches to be performed across data sources;
    generating, responsive to the query, extracted data that includes one or more portions of at least one resource of the data sources;
    applying a language model to the extracted data to identify results data that reflect a meaning of the query;
    generating, based on applying the language model, results data retrieved from one or more of the data sources; and
    responsive to the query, rendering the results data for presentation together in a user interface of a client device.

2. The method of claim 1, wherein the language model comprises a plurality of domain language models that are each particular to an entity associated with one of the one or more data sources, wherein a domain language model includes one or more weighting values for keyworks or key phrases that are different from one or more other domain language models of the plurality.

3. The method of claim 1, wherein the language model is trained based on items of data from the one or more data sources, the language model being trained to provide relevant results data based on changing weightings for keywords or key phrases included in the items of data.

4. The method of claim 3, wherein the language model is trained based user interactions with the items of data.

5. The method of claim 1, further comprising:
    applying a language model to the extracted data to identify one or more topics related to the query requesting the data, the one or more topics associated with one or more keywords or key phrases in the extracted data by a taxonomy of a set of topics; and
    generating the results data based on the one or more topics that are identified.

6. The method of claim 1, wherein applying a language model to the extracted data to identify results data that reflect the meaning of the query comprises:
    accessing a weighting value associated with one or more keywords or key phrases in the extracted data, wherein the weighting value is associated with a particular user associated with the query, and wherein the weighting value represents a relevance for the results data associated with the one or more keywords or key phrases; and
    generating the results data based on the weighting value.

7. The method of claim 1, wherein applying a language model to the extracted data to identify results data that reflect the meaning of the query comprises:
    accessing a weighting value associated with a data source represented in the extracted data, wherein the weighting value is associated with a particular user associated with the query, and wherein the weighting value represents a relevance of the extracted data from the data source for that particular user; and
    generating the results data based on the weighting value.

8. The method of claim 1, wherein applying a language model to the extracted data to identify results data that reflect the meaning of the query comprises:
    accessing a weighting value associated with a data source represented in the extracted data, wherein the weighting value is associated with a particular user associated with the query, and wherein the weighting value represents an amount of prior interaction by the particular user with the data source represented in the extracted data; and
    generating the results data based on the weighting value.

9. The method of claim 1, wherein applying a language model to the extracted data to identify results data that reflect the meaning of the query comprises:
    accessing a weighting value associated with a data source represented in the extracted data, wherein the weighting value is associated with a particular user associated with the query, and wherein the weighting value represents a type of prior interaction by the particular user with the data source represented in the extracted data; and
    generating the results data based on the weighting value.

10. The method of claim 1, wherein applying a language model to the extracted data to identify results data that reflect the meaning of the query comprises:
    accessing a weighting value associated with a data source represented in the results data, wherein the weighting value is associated with a particular user associated with the query, and wherein the weighting value represents an age of the extracted data associated with the data source; and
    generating the results data based on the weighting value.

11. The method of claim 1, wherein one or more of the data sources is associated with credentials data, and wherein generating, responsive to the query, the extracted data comprises accessing the one or more of the data sources by retrieving the credentials data for the one or more of the data sources and providing the credentials data along with the query for the one or more data sources.

12. A system for augmenting a request for data, the system comprising:
    at least one processor; and
    a memory storing instructions that, when executed by the at least one processor, cause the at least one processor to perform operations comprising:
        receiving a query requesting data from one or more data sources, the query configured to cause a plurality of searches to be performed across data sources;
        generating, responsive to the query, extracted data that includes one or more portions of at least one resource of the data sources;
        applying a language model to the extracted data to identify results data that reflect a meaning of the query;
        generating, based on applying the language model, results data retrieved from one or more of the data sources; and
        responsive to the query, rendering the results data for presentation together in a user interface of a client device.

13. The system of claim 12, wherein the language model comprises a plurality of domain language models that are each particular to an entity associated with one of the one or more data sources, wherein a domain language model includes one or more weighting values for keyworks or key phrases that are different from one or more other domain language models of the plurality.

14. The system of claim 12, wherein the language model is trained based on items of data from the one or more data sources, the language model being trained to provide relevant results data based on changing weightings for keywords or key phrases included in the items of data.

15. The system of claim 14, wherein the language model is trained based user interactions with the items of data.

16. The system of claim 12, further comprising:
applying a language model to the extracted data to identify one or more topics related to the query requesting the data, the one or more topics associated with one or more keywords or key phrases in the extracted data by a taxonomy of a set of topics; and
generating the results data based on the one or more topics that are identified.

17. The system of claim 12, wherein applying a language model to the extracted data to identify results data that reflect the meaning of the query comprises:
accessing a weighting value associated with one or more keywords or key phrases in the extracted data, wherein the weighting value is associated with a particular user associated with the query, and wherein the weighting value represents a relevance for the results data associated with the one or more keywords or key phrases; and
generating the results data based on the weighting value.

18. The system of claim 12, wherein applying a language model to the extracted data to identify results data that reflect the meaning of the query comprises:
accessing a weighting value associated with a data source represented in the extracted data, wherein the weighting value is associated with a particular user associated with the query, and wherein the weighting value represents a relevance of the extracted data from the data source for that particular user; and
generating the results data based on the weighting value.

19. The system of claim 12, wherein applying a language model to the extracted data to identify results data that reflect the meaning of the query comprises:
accessing a weighting value associated with a data source represented in the extracted data, wherein the weighting value is associated with a particular user associated with the query, and wherein the weighting value represents an amount of prior interaction by the particular user with the data source represented in the extracted data; and
generating the results data based on the weighting value.

20. The system of claim 12, wherein applying a language model to the extracted data to identify results data that reflect the meaning of the query comprises:
accessing a weighting value associated with a data source represented in the extracted data, wherein the weighting value is associated with a particular user associated with the query, and wherein the weighting value represents a type of prior interaction by the particular user with the data source represented in the extracted data; and
generating the results data based on the weighting value.

* * * * *